United States Patent
Shaller et al.

(10) Patent No.: US 12,159,984 B1
(45) Date of Patent: Dec. 3, 2024

(54) SYSTEMS AND METHODS FOR MONITORING THERMAL CONDITIONS OF BATTERIES IN A STORAGE AREA

(71) Applicant: Nordic ID Oyj, Salo (FI)

(72) Inventors: Russell R. Shaller, Milwaukee, WI (US); Mika Karttunen, Salo (FI); Turo Rantanen, Salo (FI)

(73) Assignee: NORDIC ID OYJ (FI)

( * ) Notice: Subject to any disclaimer, the term of this patent is extended or adjusted under 35 U.S.C. 154(b) by 0 days.

(21) Appl. No.: 18/427,349

(22) Filed: Jan. 30, 2024

Related U.S. Application Data

(63) Continuation of application No. PCT/FI2023/050695, filed on Dec. 14, 2023.

(51) Int. Cl.
  *H01M 10/48* (2006.01)

(52) U.S. Cl.
  CPC ....... *H01M 10/486* (2013.01); *H01M 10/482* (2013.01)

(58) Field of Classification Search
  None
  See application file for complete search history.

(56) References Cited

U.S. PATENT DOCUMENTS

| | | |
|---|---|---|
| 9,261,886 B2 | 2/2016 | Chen et al. |
| 9,869,726 B2 | 1/2018 | Zumstein et al. |

(Continued)

FOREIGN PATENT DOCUMENTS

| | | |
|---|---|---|
| CN | 203243407 U | 10/2013 |
| CN | 203643895 U | 6/2014 |

(Continued)

OTHER PUBLICATIONS

Han, Y. Design of Electric Vehicle Charging Station Based on PROFINET Bus Technology Considering Safety; In: 2021 International Conference on Power System Technology POWERCON 2021, Dec. 8-9, 2021, doi: 10.1109/POWERCON53785.2021. 9697789; abstract; sections IIIA, IVB, IVCb, VBb; fig. 6.

(Continued)

*Primary Examiner* — Scott J. Chmielecki
(74) *Attorney, Agent, or Firm* — Thomas M. Hardman

(57) ABSTRACT

Battery-monitoring wireless temperature sensors (WTSs) are positioned so that they can obtain temperature data related to batteries that are being stored in a storage area. Reference WTSs are positioned throughout the storage area to provide representative ambient temperature data. The battery-monitoring WTSs and the reference WTSs wirelessly transmit temperature measurements to a temperature processing system. The temperature processing system processes the battery-monitoring temperature measurements based on the reference temperature measurements and previous battery-monitoring temperature measurements. In some embodiments, the temperature processing system compares a battery-monitoring temperature measurement received from a particular battery-monitoring WTS to (i) at least one reference temperature measurement, and (ii) any previous battery-monitoring temperature measurements from that same WTS. If the battery-monitoring temperature measurement exceeds (i) or (ii) by a predefined threshold amount, then some type of preventive action is initiated.

20 Claims, 10 Drawing Sheets

(56) References Cited

U.S. PATENT DOCUMENTS

| | | | |
|---|---|---|---|
| 10,769,920 | B2 | 9/2020 | Skaaksrud |
| 10,911,089 | B2 | 2/2021 | Jacobsen |
| 11,068,765 | B2 | 7/2021 | Erhart |
| 11,178,228 | B2 | 11/2021 | Skaaksrud |
| 11,184,443 | B2 | 11/2021 | Skaaksrud |
| 11,698,415 | B1* | 7/2023 | Jemison .............. H01M 10/486 340/636.1 |
| 11,778,029 | B2 | 10/2023 | Skaaksrud |
| 2013/0344355 | A1* | 12/2013 | Kozinsky .......... H02J 7/007194 429/50 |
| 2015/0345458 | A1* | 12/2015 | Schramme ............ F02N 11/108 701/33.7 |
| 2015/0365737 | A1* | 12/2015 | Miller ..................... H02J 50/10 340/870.02 |
| 2020/0387844 | A1* | 12/2020 | Tischer .................. G16H 40/40 |
| 2021/0319276 | A1 | 10/2021 | Haensgen et al. |
| 2021/0382971 | A1* | 12/2021 | Ebisu ...................... B60L 53/80 |
| 2022/0185493 | A1* | 6/2022 | Chen ...................... H02J 7/0048 |
| 2022/0278546 | A1* | 9/2022 | Okura ............... H01M 10/4207 |
| 2022/0407176 | A1* | 12/2022 | Ryder .................... A62C 37/40 |
| 2023/0023717 | A1* | 1/2023 | Tzeng ................. H01M 10/615 |
| 2023/0076747 | A1* | 3/2023 | Suzuki .................. H01M 10/48 |
| 2023/0207918 | A1* | 6/2023 | Bahei-Eldin ........ H01M 10/613 320/150 |
| 2023/0219422 | A1* | 7/2023 | Wagner ................. H01M 10/48 701/29.4 |
| 2023/0361384 | A1* | 11/2023 | Ma ........................ H01M 10/63 |

FOREIGN PATENT DOCUMENTS

| | | |
|---|---|---|
| CN | 208806335 U | 4/2019 |
| CN | 209328028 U | 8/2019 |
| CN | 210606004 U | 5/2020 |
| CN | 201716745 U | 1/2021 |
| CN | 212693981 U | 3/2021 |
| CN | 114379974 A | 4/2022 |
| CN | 116632974 A | 8/2023 |
| EP | 3614483 A1 | 2/2020 |
| JP | 6431268 B2 | 11/2018 |
| TW | 202119691 A | 5/2021 |
| WO | 2018196898 A1 | 11/2018 |

OTHER PUBLICATIONS

International Search Report and the Written Opinion dated Sep. 9, 2024; Intl. Appl. No. PCT/FI2023/050695—(14) pages.

* cited by examiner

SYSTEMS AND METHODS FOR MONITORING THERMAL CONDITIONS OF BATTERIES IN A STORAGE AREA

CROSS-REFERENCE TO RELATED APPLICATIONS

This application claims the benefit of and priority to International Patent Application No. PCT/FI2023/050695, filed Dec. 14, 2023, and titled "Systems and Methods for Monitoring Thermal Conditions of Batteries in a Storage Area," the entire contents of which are incorporated herein by reference.

BACKGROUND

With the ever-growing demands of the electronics industry, as well as the rise of electric vehicles and renewable energy storage solutions, lithium-ion batteries have found widespread use. They power everything from smartphones, laptops, and wearable devices to larger applications like electric cars and energy storage systems for renewable energy grids. The appeal of these batteries lies in their relatively high energy density, long cycle life, and declining costs, making them the preferred choice for numerous applications.

However, the proper storage of lithium-ion batteries can be quite challenging. This is especially true when lithium-ion batteries are stored in large quantities. One significant concern is the phenomenon known as "thermal runaway," which is a self-sustaining exothermic reaction that can occur when a battery is damaged, subjected to extreme temperatures, or has an internal short circuit. Once initiated within a battery, thermal runaway can lead to rapid increases in temperature, potentially causing the battery to catch fire or even explode. This not only poses a danger to the individual battery but can also lead to chain reactions in adjacent batteries, amplifying the risk of significant fires or explosions.

There are a variety of scenarios where the potential for thermal runaway is magnified. One example is in a warehouse, where large numbers of lithium-ion batteries are often stored in close proximity in large stacks or on closely spaced shelving. Once a single battery experiences thermal runaway, the intense heat generated can easily propagate to adjacent batteries, creating a domino effect. This chain reaction can lead to large-scale fires that are challenging to control and extinguish due to the high energy content and chemical nature of lithium-ion batteries. Such fires can result in extensive damage to the warehouse facility, leading to significant financial losses. In addition, the destruction of stored goods can disrupt supply chains, causing further economic repercussions for businesses reliant on the stored materials. Moreover, warehouse fires pose a severe risk to personnel, potentially leading to injuries or fatalities.

Another example involves batteries included in items, such as electric vehicles, that are being transported from one place to another. In recent years, there have been multiple instances where costly shipping vessels have been destroyed due to fires initiated by lithium-ion batteries experiencing thermal runaway. The destruction of a single vessel due to a fire can have profound economic ramifications, not only in terms of the immediate loss of the vessel and its cargo but also in the form of indirect costs such as environmental damage, legal liabilities, and disruptions in supply chains.

Given the importance of maintaining safe thermal conditions for lithium-ion batteries in storage environments, there exists a need for systems and methods that can effectively monitor and assess the thermal conditions of such batteries in real-time.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The present disclosure is generally related to systems and methods for assessing the thermal conditions of batteries (e.g., lithium-ion batteries) under storage conditions. The techniques disclosed herein utilize wireless temperature sensors. As used herein, the term "wireless temperature sensor" (WTS) refers to a device or assembly that is capable of measuring temperature and wirelessly transmitting the corresponding temperature data to a receiving unit or system.

In accordance with the present disclosure, a plurality of WTSs are positioned so that they can obtain temperature data related to batteries that are being stored in a storage area. In addition, a plurality of WTSs are positioned throughout the storage area to provide representative ambient temperature data. To distinguish the WTSs that are designed to obtain temperature data related to the batteries from the WTSs that that obtain ambient temperature data, the former may be referred to herein as "battery-monitoring WTSs" and the latter may be referred to herein as "reference WTSs."

The battery-monitoring WTSs and the reference WTSs wirelessly transmit temperature measurements to a temperature processing system. To distinguish the temperature measurements made by the battery-monitoring WTSs from the temperature measurements made by the reference WTSs, the former may be referred to herein as "battery-monitoring temperature measurements" and the latter may be referred to herein as "reference temperature measurements."

The temperature processing system processes the battery-monitoring temperature measurements based on the reference temperature measurements and previous battery-monitoring temperature measurements. More specifically, the temperature processing system compares a battery-monitoring temperature measurement received from a particular battery-monitoring WTS to (i) at least one reference temperature measurement, and (ii) any previous battery-monitoring temperature measurements from that same WTS. If the battery-monitoring temperature measurement exceeds (i) or (ii) by a predefined threshold amount, then some type of preventive action is initiated. The temperature processing system can be configured to process each battery-monitoring temperature measurement it receives in this manner.

In some embodiments, the selection of a reference temperature measurement for comparison with a particular battery-monitoring temperature measurement is based on spatial proximity and temporal proximity. More specifically, the process of selecting a reference temperature measurement for comparison with a particular battery-monitoring temperature measurement can include (a) identifying the reference WTS that is closest in spatial proximity to the battery-monitoring WTS that obtained the battery-monitoring temperature measurement, and (b) identifying the reference temperature measurement made by the reference WTS identified in (a) that is closest in time to the battery-monitoring temperature measurement under consideration.

As mentioned previously, when a lithium-ion battery begins to overheat, it enters a phase known as thermal runaway, where the temperature rises rapidly due to exothermic reactions within the battery. In most cases, however, this increase in temperature does not immediately lead to a fire. There is usually some period of time (e.g., at least a few hours) where some type of preventive action can be taken. (This will be described in greater detail below in connection with FIG. 1A.) The early detection of an abnormal temperature increase, as facilitated by the systems and methods disclosed herein, allows for timely intervention.

There are many different types of preventive actions that can be initiated in accordance with the present disclosure. As one example, a notification message can be sent to at least one predefined communication endpoint (e.g., a mobile device number, an email address) that is associated with one or more users who are responsible for the storage area. As another example, the preventive action can include isolating the batter(ies) with excessively high temperatures, such as by signaling a robotic system to automatically relocate the batter(ies).

In some embodiments, in addition to monitoring the temperature data itself, the temperature processing system can also monitor the elapsed time since a temperature measurement was received from each battery-monitoring WTS. When the elapsed time for any given battery-monitoring WTS exceeds a predefined threshold, some type of notification message can be initiated. This feature reduces the likelihood that any battery's temperature will go unmonitored for prolonged time periods.

The systems and methods disclosed herein can be utilized in a wide variety of scenarios. For example, one potential use case involves batteries stored within containers in warehouse environments. Another use case involves the transportation of items containing batteries, such as the maritime transportation of electric vehicles (EVs) aboard shipping vessels. Those skilled in the art will recognize additional use cases that could benefit from the techniques disclosed herein.

There are a variety of ways that a battery-monitoring WTS can be placed in thermal communication with a battery. For example, in a warehouse scenario, the batteries can be included in containers that are stored on shelves, and the battery-monitoring WTSs can be attached to the containers. As another example, in a scenario where cargo units having batteries (e.g., electric vehicles) are being transported via a transportation system, the battery-monitoring WTSs can be removably attached to the cargo units when the cargo units are loaded onto the transportation system. The battery-monitoring WTSs can then be removed from the cargo units when the cargo units are unloaded from the transportation system.

In some embodiments, the temperature processing system can be configured to automatically determine the location of a battery-monitoring WTS through geolocation techniques. For example, the temperature processing system can utilize wireless signals received from the battery-monitoring WTS in conjunction with wireless signals from at least two reference WTSs whose locations are known to determine the location of a battery-monitoring WTS. In some implementations, the temperature processing system can be configured to analyze signal characteristics (e.g., signal strength and timing metrics) from the battery-monitoring WTS relative to the reference WTSs. The use of geolocation techniques to determine the location of battery-monitoring WTSs can be particularly useful in scenarios without inherent battery location tracking capabilities, such as the maritime shipment of electric vehicles where such features are not standard and can be difficult to implement.

In embodiments where the batteries are included in containers that are stored within a warehouse, the warehouse can include at least two different areas: a container storage area, and a container intake area where new containers are processed before being placed in the container storage area. Each container can include a machine-readable object (e.g., a barcode) that includes a unique container ID. The container intake area can include an object-reading device configured to read the unique container ID from machine-readable objects that are attached to the containers. The container intake area can also include a sensor-reading device for reading a unique sensor ID from battery-monitoring WTSs that are attached to containers. In some embodiments, the following operations can be performed with respect to a container in the container intake area before the container is added to the container storage area: (i) the machine-readable object that is attached to the container can be read by a reading device in the container intake area, thereby obtaining the unique container ID associated with the container; (ii) the unique sensor ID in each battery-monitoring WTS that is attached to the container can be read by the sensor-reading device; and (iii) the unique container ID can be mapped to the unique sensor ID(s) in a suitable database.

In some embodiments, a system for monitoring thermal conditions of a plurality of batteries in a storage area is provided. The system includes a plurality of battery-monitoring wireless temperature sensors that are configured to be placed in thermal communication with the plurality of batteries. The system also includes a plurality of reference wireless temperature sensors that are positioned at a plurality of different locations within the storage area to provide representative ambient temperature data. The system also includes a wireless communication interface that is configured to obtain battery-monitoring temperature measurements from the plurality of battery-monitoring wireless temperature sensors and reference temperature measurements from the plurality of reference wireless temperature sensors. The system also includes one or more processors and a temperature processing module that is executable by the one or more processors to process the battery-monitoring temperature measurements based on the reference temperature measurements and previous battery-monitoring temperature measurements. Processing a battery-monitoring temperature measurement can include initiating a preventive action with respect to at least one battery when the battery-monitoring temperature measurement exceeds at least one reference temperature measurement or at least one previous battery-monitoring temperature measurement by a temperature difference threshold.

In some embodiments, a method for monitoring thermal conditions of a plurality of batteries in a storage area is provided. The method includes placing a plurality of battery-monitoring wireless temperature sensors in thermal communication with the plurality of batteries. The method also includes placing a plurality of reference wireless temperature sensors at a plurality of different locations within the storage area to provide representative ambient temperature data. The method also includes obtaining a plurality of reference temperature measurements from the plurality of reference wireless temperature sensors and obtaining a plurality of battery-monitoring temperature measurements from the plurality of battery-monitoring wireless temperature sensors. The method also includes processing the plurality of battery-monitoring temperature measurements based on the plurality of reference wireless temperature measurements. Processing a battery-monitoring temperature measurement can include initiating a preventive action with respect to at least one battery when the battery-monitoring temperature measurement exceeds at least one reference temperature measurement or at least one previous battery-monitoring temperature measurement by a temperature difference threshold.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
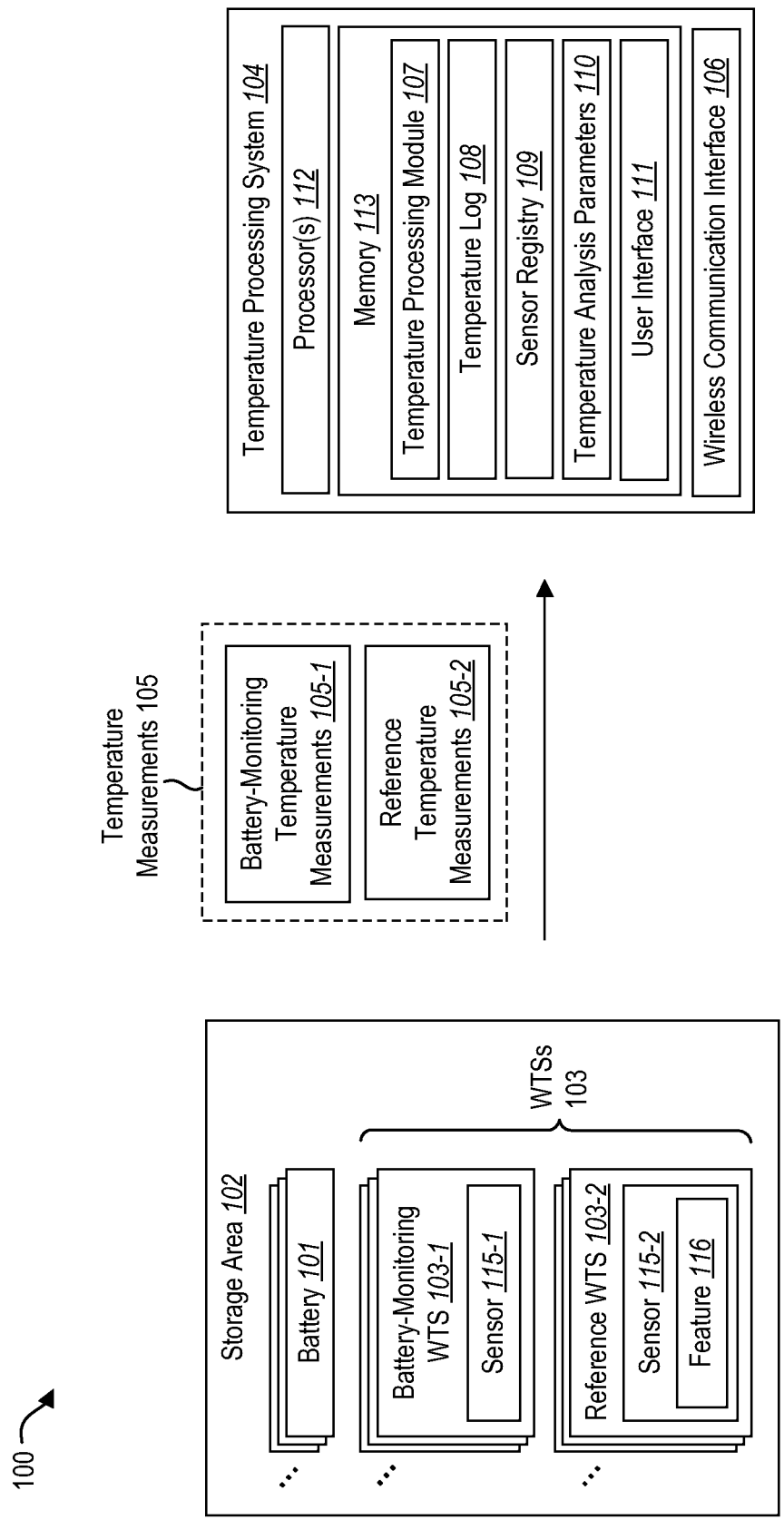
FIG. 1 illustrates aspects of a system for monitoring thermal conditions of batteries in a storage area in accordance with the present disclosure.

FIG. 1 illustrates aspects of a system 100 for monitoring thermal conditions of batteries 101 in a storage area 102 in accordance with the present disclosure. The storage area 102 includes a plurality of WTSs 103, including battery-monitoring WTSs 103-1 and reference WTSs 103-2. As noted above, the battery-monitoring WTSs 103-1 are configured to obtain temperature data related to the batteries 101, and the reference WTSs 103-2 are configured to obtain ambient temperature data.

The battery-monitoring WTSs 103-1 are placed in thermal communication with the batteries 101. In this context, the term "thermal communication" refers to the placement of a battery-monitoring WTS 103-1 in relation to at least one battery 101 such that the battery-monitoring WTS 103-1 can detect and measure temperature conditions of the batter(ies) 101. As non-limiting examples, a battery-monitoring WTS 103-1 can be considered to be in thermal communication with a battery 101 if the battery-monitoring WTS 103-1 is directly attached to the battery 101, the battery-monitoring WTS 103-1 is attached to a container in which the battery 101 is located, or the battery-monitoring WTS 103-1 is attached to an object (e.g., an electric vehicle) in which the battery 101 is embedded.

In some embodiments, a battery-monitoring WTS 103-1 may be temporarily affixed to a battery 101, its container, or an associated object to facilitate short-term monitoring needs, such as during testing, transportation, or specific operational periods. Conversely, for long-term monitoring, such as in permanent installations or continuous usage scenarios, a battery-monitoring WTS 103-1 can be permanently integrated with the battery 101, its container, or the relevant object. This integration can be achieved through various means, including but not limited to, adhesive bonding, mechanical fastening, or embedding within the structure of the container or object. In both temporary and permanent configurations, the battery-monitoring WTS 103-1 maintains effective thermal communication with the battery 101, ensuring accurate and reliable temperature measurement and monitoring in all use cases.

The reference WTSs 103-2 are positioned throughout the storage area 102 to provide representative ambient temperature data. The specific way in which reference WTSs 103-2 are positioned within the storage area 102 depends on the characteristics of the storage area 102 and the manner in which the batteries 101 are stored therein. In some embodiments, reference WTSs 103-2 can be strategically placed at various heights and locations to ensure a comprehensive temperature profile of the storage area 102. In some embodiments, the reference WTSs 103-2 can be arranged in a grid pattern or along predefined paths to optimize data accuracy and coverage. Additional examples will be described below.

The battery-monitoring WTSs 103-1 and the reference WTSs 103-2 are communicatively coupled to a temperature processing system 104. The battery-monitoring WTSs 103-1 and the reference WTSs 103-2 are configured to wirelessly transmit temperature measurements 105 to the temperature processing system 104. As noted above, the temperature measurements 105 from the battery-monitoring WTSs 103-1 may be referred to herein as battery-monitoring temperature measurements 105-1, and the temperature measurements 105 from the reference WTSs 103-2 may be referred to herein as reference temperature measurements 105-2.

Communication between the WTSs 103 (both the battery-monitoring WTSs 103-1 and the reference WTSs 103-2) and the temperature processing system 104 can occur in accordance with a wide variety of wireless communication technologies. Some non-limiting examples of wireless communication technologies that could be used include RFID (Radio Frequency Identification), NFC (Near Field Communication), Bluetooth, Bluetooth Low Energy (BLE), Wi-Fi, LoRa (Long Range), NB-IoT (Narrowband IoT), LTE-M (Long Term Evolution for Machines), 5G New Radio (NR) for IoT, Zigbee, Z-Wave, WirelessHART (Wireless Highway Addressable Remote Transducer), Thread, Sigfox, ISA100.11a (Industrial Wireless Automation), ANT/ANT+ (Advanced and Adaptive Network Technology), or other similar wireless communication technologies. This list is intended to be illustrative and not exhaustive, allowing for the incorporation of other wireless communication technologies, including emerging wireless communication technologies as they become available.

The temperature processing system 104 includes a wireless communication interface 106 that is configured to receive battery-monitoring temperature measurements 105-1 from the battery-monitoring WTSs 103-1 and to receive reference temperature measurements 105-2 from the reference WTSs 103-2. The wireless communication interface 106 includes hardware and/or software components that are configured to decode and process wireless signals that are received from the battery-monitoring WTSs 103-1 and the reference WTSs 103-2. The specific nature of these components is determined by the wireless technology that is being used, as will be discussed in greater detail below. In some embodiments, the wireless communication interface 106 includes a flexible architecture that allows it to interface with a plurality of different wireless technologies.

The WTSs 103 (including the battery-monitoring WTSs 103-1 and the reference WTSs 103-2) and the wireless communication interface 106 operate together to ensure robust and reliable transmission and reception of temperature measurements 105. These components are configured to maintain reliable and secure communication channels between the WTSs 103 and the temperature processing system 104, facilitating accurate and timely data transmission and reception.

In some embodiments, the battery-monitoring WTSs 103-1 and the reference WTSs 103-2 include active transponders. In other words, the battery-monitoring WTSs 103-1 and the reference WTSs 103-2 each have their own power source and actively transmit temperature measurements 105 to the temperature processing system 104. In some other embodiments, the battery-monitoring WTSs 103-1 and the reference WTSs 103-2 include passive transponders. In such embodiments, the battery-monitoring WTSs 103-1 and the reference WTSs 103-2 do not have an internal power source. Instead, they derive energy from an interrogation signal sent by the temperature processing system 104 or nearby readers. The use of passive WTSs 103 could be particularly advantageous in scenarios where long-term monitoring is required without the need for frequent battery replacements or maintenance of the WTSs 103.

The temperature processing system 104 includes a temperature processing module 107 that is configured to process the temperature measurements 105 that are received from the WTSs 103. In some embodiments, the temperature processing module 107 is configured to process the battery-monitoring temperature measurements 105-1 based on the reference temperature measurements 105-2 as well as previous battery-monitoring temperature measurements 105-1. The temperature processing module 107 can also be configured to initiate preventive action(s) when certain conditions are satisfied. For example, the temperature processing module 107 can be configured to compare a battery-monitoring temperature measurement 105-1 received from a particular battery-monitoring WTS 103-1 to (i) a corresponding reference temperature measurement 105-2, and/or (ii) a previous battery-monitoring temperature measurement 105-1 received from the same battery-monitoring WTS 103-1. The temperature processing module 107 can be configured to initiate preventive action(s) when a battery-monitoring temperature measurement 105-1 received from a particular battery-monitoring WTS 103-1 exceeds (i) or (ii) by a predefined threshold amount. The operation of the temperature processing module 107 will be described in greater detail below.

The temperature processing system 104 also includes a temperature log 108, a sensor registry 109, temperature analysis parameters 110, and a user interface 111. The temperature log 108 stores a history of the temperature measurements 105 received from WTSs 103 (including the battery-monitoring temperature measurements 105-1 received from the battery-monitoring WTSs 103-1 and the reference temperature measurements 105-2 received from the reference WTSs 103-2). The sensor registry 109 includes information about each WTS 103 (both battery-monitoring WTSs 103-1 and reference WTSs 103-2) from which temperature measurements 105 are received, linking each WTS 103 to its respective data stream(s) and enabling efficient management and identification. The temperature analysis parameters 110 define the criteria used in analyzing temperature measurements 105, including the predefined threshold that signals when preventive action(s) should be initiated for one or more batteries 101. The user interface 111 enables users to interact with the temperature processing system 104, providing real-time insights and control over the monitoring process. Each of these components will be described in greater detail below.

Each WTS 103 includes a sensor ID 115 that uniquely identifies the WTS 103. More specifically, each battery-monitoring WTS 103-1 includes a sensor ID 115-1 that uniquely identifies the battery-monitoring WTS 103-1. Similarly, each reference WTS 103-2 includes a sensor ID 115-2 that uniquely identifies the reference WTS 103-2. Each sensor ID 115-2 corresponding to a reference WTS 103-2 includes a distinguishing feature 116 that distinguishes reference WTSs 103-2 from battery-monitoring WTSs 103-1. The temperature processing system 104 can determine whether a temperature measurement 105 received from a WTS 103 originates from a reference WTS 103-2 based on whether the distinguishing feature 116 is present within the sensor ID 115 accompanying the temperature measurement 105.

There are many different ways to include distinguishing features 116 in the sensor IDs 115-2 of reference WTSs 103-2. Some non-limiting examples are: using a specific prefix or suffix in the sensor ID 115-2 of the reference WTSs 103-2, including a special character or set of characters that is only used in the sensor IDs 115-2 for reference WTSs 103-2, and designing the sensor IDs 115-2 for reference WTSs 103-2 to have a different length or format compared to the sensor IDs 115-1 for the battery-monitoring WTSs 103-1. Those skilled in the art will recognize other ways to embed distinguishing features 116 in the sensor IDs 115-2 of reference WTSs 103-2 in accordance with the systems and methods disclosed herein.

The temperature processing system 104 includes at least one processor 112 and memory 113 communicatively coupled to the processor(s) 112. The temperature processing module 107, temperature log 108, sensor registry 109, temperature analysis parameters 110, and user interface 111 are stored in the memory 113. These components can include instructions and/or data (as those terms are defined below). The instructions within a particular component are executable by the processor(s) 112 to perform the operations that are described herein in relation to the component. Execution of the instructions can involve the use of the data.

In some embodiments, some or all of the components of the temperature processing system 104 can be implemented in the "cloud." In other words, the software and/or hardware components of the temperature processing system 104 can be implemented via a combination of computing hardware and software that is maintained and operated by a cloud computing provider for the purpose of providing cloud computing services. Examples of such cloud computing services include Amazon Web Services and Microsoft Azure. In embodiments that utilize a cloud-based temperature processing system 104, communication via the WTSs 103 and the temperature processing system 104 can occur via the Internet.

In some embodiments, some or all of the components of the temperature processing system 104 can be implemented locally. A local implementation can involve deploying the temperature processing system 104 within the physical proximity of the storage area 102, such as in an on-site server, a dedicated computing device, or an integrated control unit.

In some embodiments, some of the components of the temperature processing system 104 can be implemented locally, while other components of the temperature processing system 104 can be implemented in the cloud.

In some embodiments, the WTSs 103 (including both battery-monitoring WTSs 103-1 and reference WTSs 103-2) can be configured to transmit other information to the temperature processing system 104 along with the temperature measurements 105. The collection of information that a WTS 103 sends to the temperature processing system 104 in connection with a particular temperature measurement may be referred to herein as a "temperature measurement packet." Those skilled in the art will recognize that, in this context, the term "packet" does not imply a requirement for a single, simultaneous transmission of data, but rather refers to the complete set of data related to a specific temperature measurement, regardless of the transmission sequence or timing.

In some embodiments, the batteries 101 are lithium-ion batteries. However, the systems and methods disclosed herein are also applicable to other types of rechargeable and non-rechargeable batteries where the risk of thermal runaway exists. These may include, but are not limited to, nickel-cadmium, nickel-metal hydride, lead-acid, and solid-state batteries.

Figure 1A:
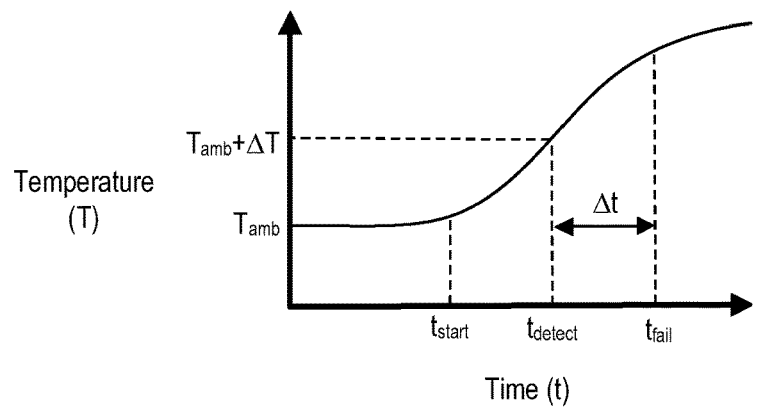
FIG. 1A is a graph illustrating an example of the behavior of a battery that experiences thermal runaway.

FIG. 1A is a graph illustrating, in general terms, an example of the behavior of a battery 101 that experiences thermal runaway. The x-axis of the graph represents time (t), and the y-axis of the graph represents temperature (T).

As noted above, when a certain type of battery 101 (e.g., a lithium-ion battery) begins to overheat, it enters a phase known as thermal runaway. In the example shown in FIG. 1A, $T_{amb}$ represents the ambient temperature of the part of the storage area 102 where the battery 101 is located. In the present example, it will be assumed that the temperature of the battery 101 is substantially equal to $T_{amb}$ before the battery 101 begins experiencing thermal runaway.

The point in time at which the battery 101 begins experiencing thermal runaway is labeled as $t_{start}$. Beginning at $t_{start}$, the temperature of the battery 101 begins rising rapidly due to exothermic reactions within the battery 101. In most cases, however, this increase in temperature does not immediately lead to a catastrophic failure, such as a fire. There is usually some period of time before a catastrophic failure occurs. The point in time at which a catastrophic failure occurs is labeled as $t_{fail}$.

As described above, the systems and methods disclosed herein involve monitoring the temperature of the battery 101 and taking some preventive action if the temperature of the battery 101 increases by a predefined threshold amount. In the depicted example, that predefined threshold amount is represented as $\Delta T$. The point in time at which the temperature processing system 104 detects that the temperature of the battery 101 has increased by $\Delta T$ is represented as $t_{detect}$.

There is a period of time, labeled as $\Delta t$, between $t_{detect}$ (i.e., the point in time at which the temperature processing system 104 detects that the temperature of the battery 101 has increased by $\Delta T$) and trail (i.e., the point in time at which a catastrophic failure occurs). This period of time, $\Delta t$, is usually at least several hours. Therefore, there is usually sufficient time after an elevated temperature (e.g., $T_{amp}+\Delta T$) has been detected to take some type of preventive action to potentially prevent a catastrophic failure (e.g., a fire that spreads to a plurality of batteries 101).

Figure 2:
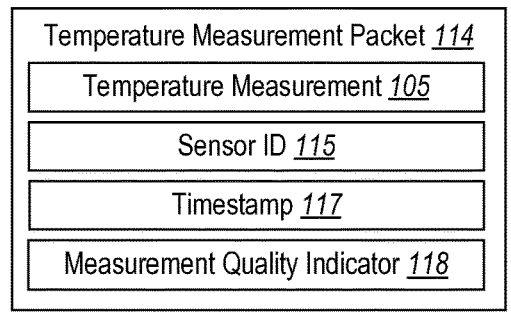
FIG. 2 illustrates an example of a temperature measurement packet that can be transmitted from a WTS (either a battery-monitoring WTS or a reference WTS) to the temperature processing system in the system shown in FIG. 1.

FIG. 2 illustrates an example of a temperature measurement packet 114 that can be transmitted from a WTS 103 (either a battery-monitoring WTS 103-1 or a reference WTS 103-2) to the temperature processing system 104.

The temperature measurement packet 114 includes a temperature measurement 105. If the temperature measurement packet 114 is sent by a battery-monitoring WTS 103-1, then the temperature measurement 105 is a battery-monitoring temperature measurement 105-1 related to one or more batteries 101. If the temperature measurement packet 114 is sent by a reference WTS 103-2, then the temperature measurement 105 is a reference temperature measurement 105-2 that provides information about the ambient temperature. The temperature measurement 105 can be in degrees Celsius or Fahrenheit.

The temperature measurement packet 114 also includes a sensor ID 115 corresponding to the WTS 103 that sent the temperature measurement packet 114. The sensor ID 115 associated with a particular WTS 103 can be uniquely associated with that WTS 103. The sensor ID 115 can include alphanumeric characters. In some embodiments, the sensor ID 115 can indicate one or more characteristics of the WTS 103 (e.g., the model number of the WTS 103 and/or manufacturing details associated with the WTS 103, such as the production date).

The temperature measurement packet 114 also includes a timestamp 117. In some embodiments, the timestamp 117 can indicate when the temperature measurement 105 was made by the WTS 103. Alternatively, the timestamp 117 can indicate when the temperature measurement packet 114 is sent by the WTS 103.

The temperature measurement packet 114 also includes a measurement quality indicator 118. The measurement quality indicator 118 provides information about the reliability or accuracy of the temperature measurement 105. The measurement quality indicator 118 could be based on factors such as sensor calibration, environmental conditions, sensor operational status, or the like. In some embodiments, the measurement quality indicator 118 can have two possible values: a first value indicating that the temperature measurement 105 is of high quality, and a second value indicating that the quality of the temperature measurement 105 is low or uncertain. In other embodiments, the measurement quality indicator 118 can have more than two possible values (e.g., high, average, low, uncertain).

Figure 3:
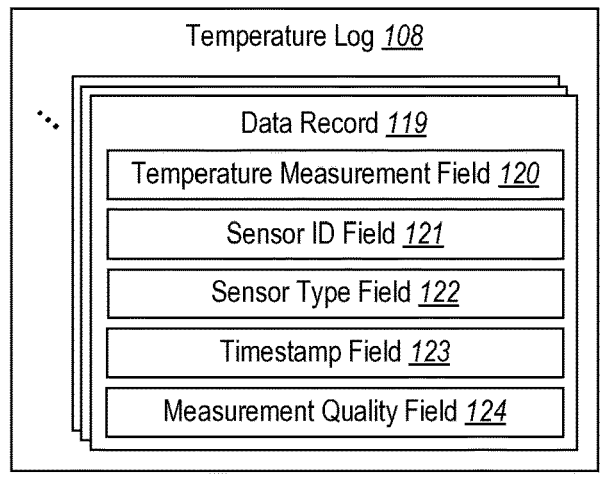
FIG. 3 illustrates an example of the temperature log in the temperature processing system shown in FIG. 1.

FIG. 3 illustrates an example of the temperature log 108. As noted above, the temperature log 108 stores a history of the temperature measurements 105 received from WTSs 103. The temperature log 108 includes a plurality of data records 119. In some embodiments, each data record 119 in the temperature log 108 corresponds to a temperature measurement packet 114 received from a WTS 103. For example, in response to receiving a temperature measurement packet 114 from a WTS 103, the temperature processing module 107 can be configured to create a data record 119 in the temperature log 108 that includes some or all of the information contained in the temperature measurement packet 114. The temperature processing module 107 can be configured to create a data record 119 in the temperature log 108 for each temperature measurement packet 114 received from a WTS 103.

The fields within the data records 119 of the temperature log 108 are designed to store the information contained in the temperature measurement packets 114 and/or additional information that is derived from the information contained in the temperature measurement packets 114. In the depicted embodiment, each data record 119 includes a temperature measurement field 120, a sensor ID field 121, a sensor type field 122, a timestamp field 123, and a measurement quality field 124.

The temperature measurement field 120 stores a temperature measurement 105. The sensor ID field 121 stores a sensor ID 115.

The sensor type field 122 stores an indication of the type of WTS 103 (battery-monitoring WTS 103-1 or reference WTS 103-2) that sent the temperature measurement 105 stored in the temperature measurement field 120. In some embodiments, the sensor type field 122 can have two possible values: a first value indicating that a battery-monitoring WTS 103-1 sent the temperature measurement 105, and a second value indicating that a reference WTS 103-2 sent the temperature measurement 105. The temperature processing module 107 can determine the value of the sensor type field 122 based on whether the sensor ID 115 includes the distinguishing feature 116.

The timestamp field 123 stores at least one timestamp 117 associated with the temperature measurement 105 stored in the temperature measurement field 120. In some embodiments, the value of the timestamp field 123 can be set to the timestamp 117 in the temperature measurement packet 114 received from the WTS 103. Alternatively, the value of the timestamp field 123 can indicate when the temperature measurement 105 was received by the temperature processing system 104. In some alternative embodiments, a data record 119 can include at least two different timestamp fields 123: a first timestamp field 123 being set to the timestamp 117 in the temperature measurement packet 114 received from the WTS 103, and a second timestamp field 123 indicating when the temperature measurement 105 was received by the temperature processing system 104.

In some embodiments, the measurement quality field 124 stores the measurement quality indicator 118. Alternatively, or in addition, the measurement quality field 124 can store information that is derived from or otherwise based on the measurement quality indicator 118.

Figure 4:
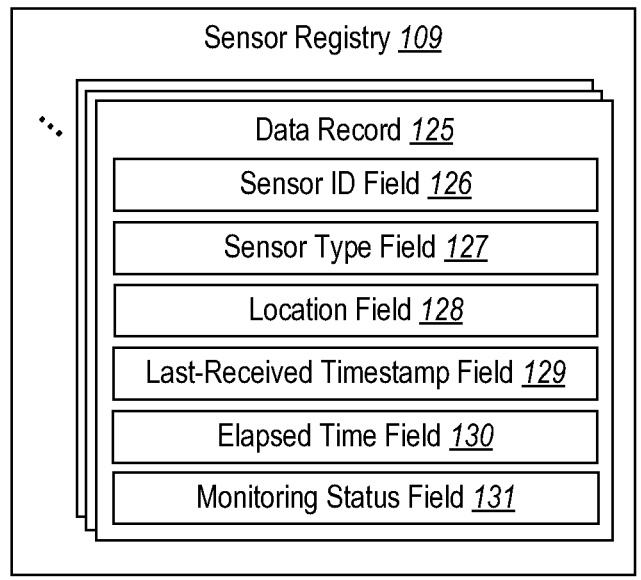
FIG. 4 illustrates an example of the sensor registry in the temperature processing system shown in FIG. 1.

FIG. 4 illustrates an example of the sensor registry 109. As noted above, the sensor registry 109 includes information about each WTS 103. The sensor registry 109 includes a plurality of data records 125. Each data record 125 corresponds to a particular WTS 103. Each data record 125 can include some or all of the following fields: a sensor ID field 126, a sensor type field 127, a location field 128, a last-received timestamp field 129, an elapsed time field 130, and a monitoring status field 131.

The sensor ID field 126 and sensor type field 127 can be similar to the sensor ID field 121 and sensor type field 122 described previously.

The location field 128 in a particular data record 125 stores information about the location of the WTS 103 corresponding to the data record 125. Many different kinds of location information can be stored in the location field 128. Some non-limiting examples of location information include specific GPS (Global Positioning System) coordinates; identifiers for storage units, racks, or shelves (e.g., "Rack 3, Shelf 2, Position 5"); reference points or identifiers linking to specific locations on a digital map of the storage area 102; references to particular zones or regions within the facility (e.g., "Storage Zone B"); descriptive notes indicating proximity to significant landmarks or features (e.g., "Adjacent to Emergency Exit 3"); and so forth.

The last-received timestamp field 129 in a particular data record 125 stores at least one timestamp 117 associated with the most recent temperature measurement 105 received from the WTS 103 corresponding to the data record 125. The temperature processing module 107 can be configured so that whenever the temperature processing module 107 receives a battery-monitoring temperature measurement 105-1 from a battery-monitoring WTS 103-1, the temperature processing module 107 updates the last-received timestamp field 129 in the data record 125 corresponding to the battery-monitoring WTS 103-1. In some embodiments, the value of the last-received timestamp field 129 can indicate when the most recent temperature measurement 105 was made by the WTS 103. Alternatively, the value of the last-received timestamp field 129 can indicate when the most recent temperature measurement 105 was received by the temperature processing system 104.

The elapsed time field 130 indicates the amount of time that has elapsed since a temperature measurement 105 was last received from the WTS 103. The value of the elapsed time field 130 can be determined by calculating the difference between the current time and the value of the last-received timestamp field 129. The elapsed time field 130 can be periodically updated.

As noted above, the temperature processing system 104 can be configured to monitor the elapsed time since a temperature measurement 105 was received from each battery-monitoring WTS 103-1. The monitoring status field 131 can be utilized in connection with implementing this feature.

In some embodiments, the monitoring status field 131 can have two possible values: a first value that indicates that the WTS 103 should be monitored, and a second value that indicates that the WTS 103 should not be monitored. In some embodiments, the monitoring status field 131 can be set to the first value if the WTS 103 is a battery-monitoring WTS 103-1 that is actively being used to gather temperature data about one or more batteries 101. Otherwise, the monitoring status field 131 can be set to the second value.

Figure 5:
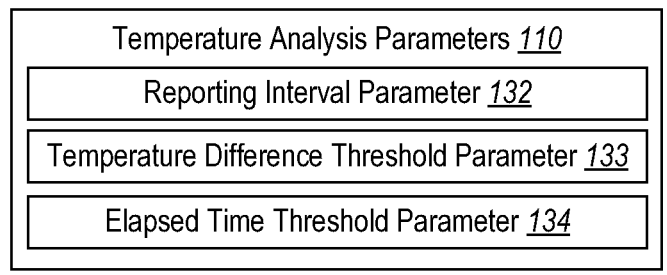
FIG. 5 illustrates an example of the temperature analysis parameters in the temperature processing system shown in FIG. 1.

FIG. 5 illustrates an example of the temperature analysis parameters 110. In the depicted embodiment, the temperature analysis parameters 110 include a reporting interval parameter 132, a temperature difference threshold parameter 133, and an elapsed time threshold parameter 134.

The reporting interval parameter 132 defines how frequently temperature measurements 105 are sent from WTSs 103 to the temperature processing system 104. In some embodiments, the same reporting interval parameter 132 defines how frequently temperature measurements 105 are sent from both battery-monitoring WTSs 103-1 and reference WTSs 103-2 to the temperature processing system 104. In some alternative embodiments, at least two different reporting interval parameters 132 can be defined: one for battery-monitoring WTSs 103-1, and another for reference WTSs 103-2.

The value of the reporting interval parameter 132 can be set based on the specific requirements of the storage area 102, allowing for flexible and adaptive monitoring. For example, in conditions where temperature fluctuations are rapid, a shorter reporting interval can be chosen to ensure timely detection of temperature anomalies. Conversely, in more stable environments, a longer interval may suffice, thereby optimizing the energy consumption and data management of the overall system 100.

The temperature difference threshold parameter 133 defines when preventive action is taken with respect to one or more batteries 101. As indicated above, the temperature processing system 104 compares a battery-monitoring temperature measurement 105-1 received from a particular battery-monitoring WTS 103-1 to (i) at least one reference temperature measurement 105-2, and (ii) any previous battery-monitoring temperature measurements 105-1 from that same battery-monitoring WTS 103-1. If the battery-monitoring temperature measurement 105-1 exceeds (i) or (ii) by a predefined threshold amount, then some type of preventive action is initiated. The temperature difference threshold parameter 133 defines what the threshold amount is. In some alternative embodiments, at least two different temperature difference threshold parameters 133 can be defined: one temperature difference threshold parameter 133 for comparison (i) described above, and another temperature difference threshold parameter 133 for comparison (ii) described above.

The elapsed time threshold parameter 134 is related to the tracking of battery-monitoring WTSs 103-1. As indicated above, the temperature processing system 104 can monitor the elapsed time since a temperature measurement 105-1 was received from each battery-monitoring WTS 103-1. When the elapsed time for any given battery-monitoring WTS 103-1 exceeds a predefined threshold, some type of corrective action can be initiated. The elapsed time threshold parameter 134 defines when such a corrective action is initiated.

Figure 6:
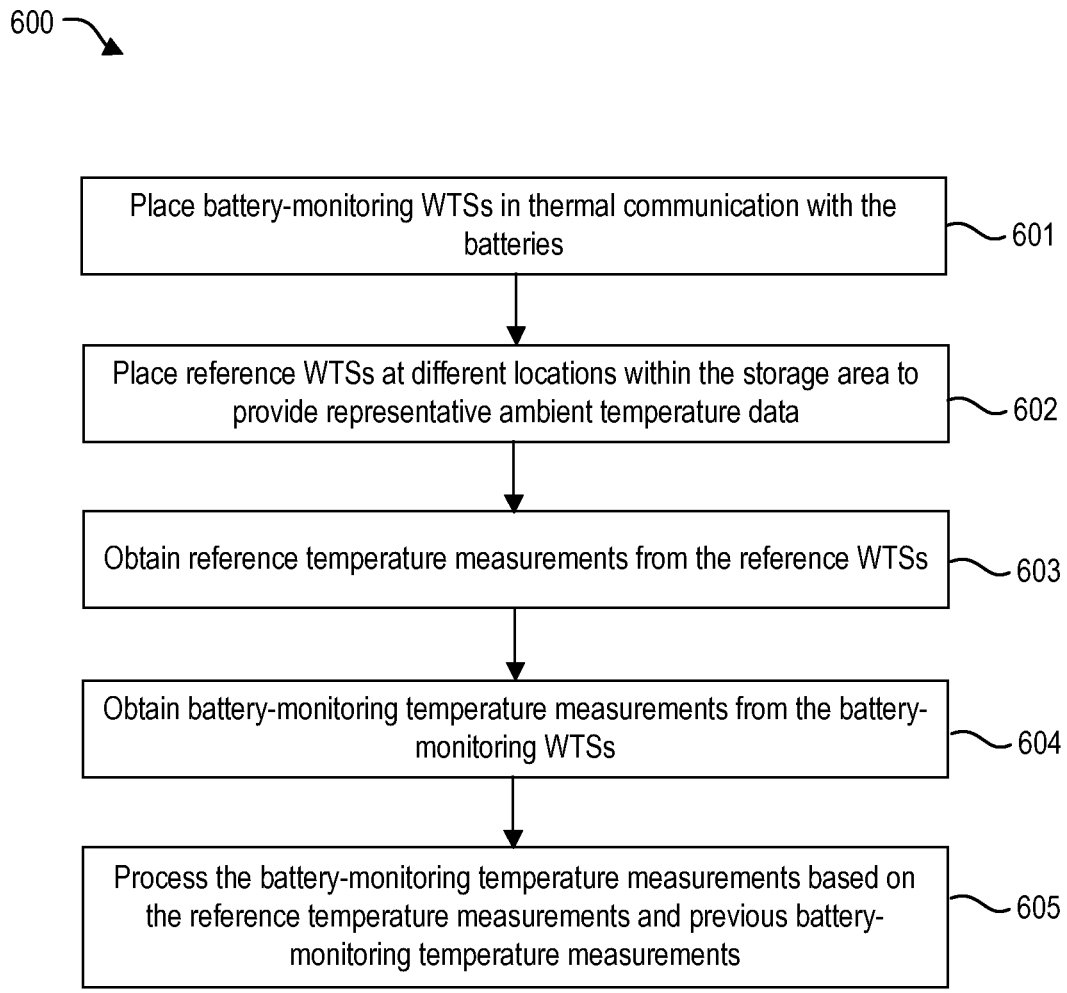
FIG. 6 illustrates an example of a method for monitoring thermal conditions of batteries in a storage area in accordance with the present disclosure.

FIG. 6 illustrates an example of a method 600 for monitoring thermal conditions of batteries 101 in a storage area 102 in accordance with the present disclosure.

At 601, battery-monitoring WTSs 103-1 are placed in thermal communication with the batteries 101. At 602, reference WTSs 103-2 are placed at different locations within the storage area 102 to provide representative ambient temperature data. Some examples illustrating how acts 601 and 602 can be implemented were described previously in connection with FIG. 1, and additional examples will be described below.

At 603, reference temperature measurements 105-2 can be obtained from the reference WTSs 103-2. At 604, battery-monitoring temperature measurements 105-1 can be obtained from the battery-monitoring WTSs 103-1. As noted above, communication between the WTSs 103 (both the battery-monitoring WTSs 103-1 and the reference WTSs 103-2) and the temperature processing system 104 can occur in accordance with a wide variety of wireless communication technologies. The specific manner in which communication occurs between the WTSs 103 and the temperature processing system 104 depends on the wireless technology that is being used.

For example, in a configuration where the WTSs 103 and the temperature processing system 104 communicate via RFID technology, each WTS 103 (both battery-monitoring WTSs 103-1 and reference WTSs 103-2) can include an RFID tag. Temperature data can be stored in memory within the RFID tags. The wireless communication interface 106 within the temperature processing system 104 can include one or more RFID readers, which periodically retrieve the stored temperature data from the RFID tag within each WTS 103. The RFID reader(s) can then transmit the temperature data to one or more designated servers (either local or remote) for further analysis.

As another example, in a configuration where the WTSs 103 and the temperature processing system 104 communicate via Wi-Fi technology (i.e., wireless local area networking technology based on the IEEE 802.11 family of standards), each WTS 103 (including both battery-monitoring WTSs 103-1 and reference WTSs 103-2) can be equipped with Wi-Fi capabilities. For example, each WTS 103 can include (or can be communicatively coupled to) a Wi-Fi module that includes a radio transceiver, antenna, and firmware for communicating using Wi-Fi protocols. The Wi-Fi module allows each WTS 103 to connect to a local Wi-Fi network. Temperature data collected by the WTSs 103 can be transmitted over this Wi-Fi network. The wireless communication interface 106 within the temperature processing system 104 can be connected to the same Wi-Fi network, so that it receives the temperature data directly from each WTS 103.

As another example, in a configuration where Bluetooth technology facilitates communication between the WTSs 103 (both battery-monitoring WTSs 103-1 and reference WTSs 103-2) and the temperature processing system 104, each WTS 103 can be equipped with a Bluetooth transmitter. The wireless communication interface 106 within the temperature processing system 104 can include one or more Bluetooth receivers or devices with integrated Bluetooth capability. These receivers can be configured to continuously or periodically connect to the WTSs 103 to receive the latest temperature measurements 105.

The foregoing examples are provided for illustrative purposes only and should not be interpreted as limiting the scope of the present disclosure. It is to be understood that other wireless communication technologies, including but not limited to any of the specific wireless communication technologies mentioned previously, could be utilized to implement the techniques disclosed herein.

At 605, the temperature processing system 104 processes the battery-monitoring temperature measurements 105-1 based on the reference temperature measurements 105-2 and previous battery-monitoring temperature measurements 105-1. A battery-monitoring temperature measurement 105-1 received from a particular battery-monitoring WTS 103-1 can be compared to (i) at least one reference temperature measurement 105-2, and (ii) any previous battery-monitoring temperature measurements 105-1 from that same battery-monitoring WTS 103-1. The temperature processing module 107 can also be configured to initiate preventive action(s) when certain conditions are satisfied.

Figure 7:
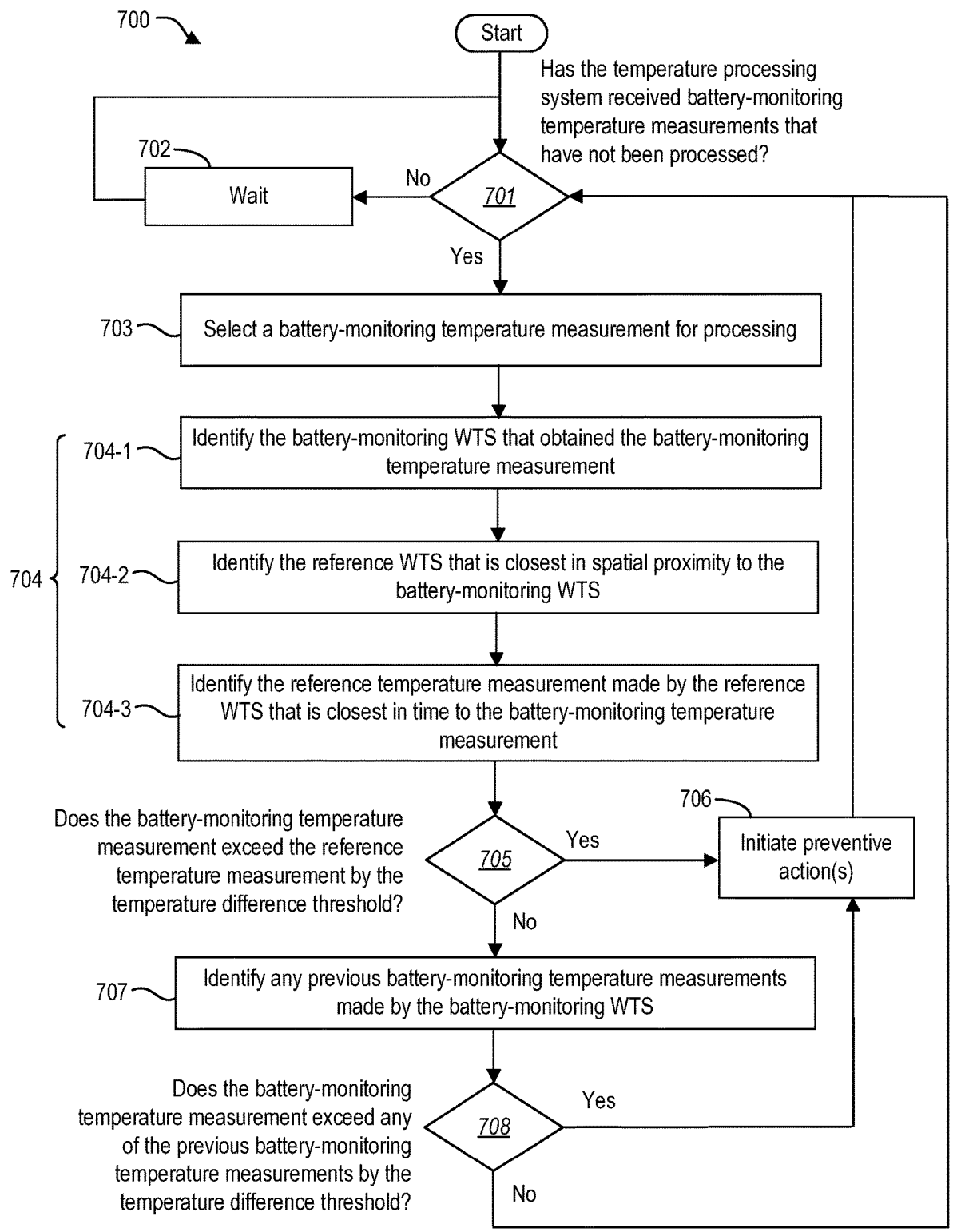
FIG. 7 illustrates an example showing how battery-monitoring temperature measurements can be processed.

FIG. 7 illustrates an example showing how battery-monitoring temperature measurements 105-1 can be processed. In other words, FIG. 7 illustrates an example showing how act 605 in the method 600 shown in FIG. 6 can be implemented. The method 700 can be performed by the temperature processing module 107 in the temperature processing system 104.

At 701, a determination is made about whether the temperature processing system 104 has received any battery-monitoring temperature measurements 105-1 from battery-monitoring WTSs 103-1 that have not yet been processed. If not, then the method 700 proceeds to 702. At 702, the method 700 involves waiting for some period of time. The method 700 then returns to 701.

If at 701 it is determined that there is at least one battery-monitoring temperature measurement 105-1 that has not yet been processed, the method proceeds to 703. At 703, a battery-monitoring temperature measurement 105-1 is selected for processing.

As noted above, processing a battery-monitoring temperature measurement 105-1 involves comparing the battery-monitoring temperature measurement 105-1 to at least one reference temperature measurement 105-2. At 704, the temperature processing module 107 selects the reference temperature measurement 105-2 for comparison with the battery-monitoring temperature measurement 105-1.

At 704-1, the temperature processing module 107 identifies the battery-monitoring WTS 103-1 that obtained the battery-monitoring temperature measurement 105-1. In some embodiments, this can include determining the sensor ID 115-1 of the battery-monitoring WTS 103-1. In some embodiments, the sensor ID 115-1 of the battery-monitoring WTS 103-1 can be included in a temperature measurement packet 114 that accompanies the battery-monitoring temperature measurement 105-1.

At 704-2, the temperature processing module 107 identifies the reference WTS 103-2 that is closest in spatial proximity to the battery-monitoring WTS 103-1. In some embodiments, this can include comparing the location of the battery-monitoring WTS 103-1 identified at 704-1 with the location of reference WTSs 103-2 in the storage area 102, via the information contained in the respective location fields 128 within the sensor registry 109.

At 704-3, the temperature processing module 107 examines the reference temperature measurements 105-2 made by the reference WTS 103-2 identified at 704-2. More specifically, the temperature processing module 107 identifies the reference temperature measurement 105-2, made by the reference WTS 103-2, that is closest in time to the battery-monitoring temperature measurement 105-1. In some embodiments, this can include searching the data records 119 in the temperature log 108 that correspond to the reference WTS 103-2 (e.g., the data records 119 where the value of the sensor ID field 121 matches the sensor ID 115-2 of the reference WTS 103-2) and then comparing the value of the timestamp field 123 within those data records 119 to the timestamp 117 corresponding to the battery-monitoring temperature measurement 105-1.

Taken collectively, acts 704-1, 704-2, and 704-3 should result in a reference temperature measurement 105-2 being identified for comparison with the battery-monitoring temperature measurement 105-1. At 705, the temperature processing module 107 compares this reference temperature measurement 105-2 with the battery-monitoring temperature measurement 105-1, and a determination is made about whether the battery-monitoring temperature measurement 105-1 exceeds the reference temperature measurement 105-2 by a predefined threshold amount. This predefined threshold amount may be referred to herein as the temperature difference threshold. The temperature difference threshold can be determined based on the temperature difference threshold parameter 133 described previously.

If the result of the determination at 705 is that the battery-monitoring temperature measurement 105-1 exceeds the reference temperature measurement 105-2 by the temperature difference threshold, then the method proceeds to 706. At 706, the temperature processing module 107 initiates at least one preventive action. There are many different types of preventive actions that can be performed in accordance with the present disclosure. For example, the temperature processing module 107 can cause a notification message to be sent to at least one communication endpoint (e.g., email address, mobile device number) that is associated with one or more users who are responsible for the storage area 102. The notification message can include information identifying (i) the batter(ies) corresponding to the battery-monitoring temperature measurement 105-1 that is excessively high, (ii) a container in which the batter(ies) are stored, and/or (iii) an object in which the batter(ies) are embedded. Alternatively, or in addition, the notification message can include location information related to (i), (ii), and/or (iii).

As another example, the temperature processing module 107 can signal a robotic system to automatically relocate the relevant batter(ies) 101 (i.e., the batter(ies) 101 that are being monitored by the battery-monitoring WTS 103-1 that sent the battery-monitoring temperature measurement 105-1).

As another example, the temperature processing module 107 can initiate a range of direct preventive actions to mitigate potential hazards. These actions can include, but are not limited to, the deployment of ceramic blankets specifically designed to insulate and protect the affected batteries 101. Such blankets can provide thermal resistance and contain any excessive heat within a localized area, thereby preventing the spread of heat to adjacent batteries 101 or storage components.

As another example, the temperature processing module 107 can also activate chemical suppressants that are strategically positioned within the storage area 102. These suppressants can be automatically released in response to excessive temperature readings, providing immediate chemical intervention to cool down the batteries 101 or halt any chemical reactions that may lead to hazardous conditions. This proactive approach ensures that the safety measures are not only reliant on human intervention following a notification but also incorporate automated, immediate responses to potential thermal anomalies detected by the battery-monitoring WTSs 103-1.

Those skilled in the art will recognize additional preventive actions that can be initiated. Once the preventive action(s) have been initiated, the method can then return to 701.

If the result of the determination at 705 is that the battery-monitoring temperature measurement 105-1 does not exceed the reference temperature measurement 105-2 by the temperature difference threshold, then the method proceeds to 707. At 707, the temperature processing module 107 identifies any previous battery-monitoring temperature measurements 105-1 made by the battery-monitoring WTS 103-1. In some embodiments, this can include searching in the temperature log 108 for data records 119 that satisfy the following criteria: (i) the value of the sensor ID field 121 matches the sensor ID 115-1 of the battery-monitoring WTS 103-1, and (ii) the value of the timestamp field 123 is earlier in time than the timestamp 117 associated with the battery-monitoring temperature measurement 105-1.

At 708, the temperature processing module 107 examines the previous battery-monitoring temperature measurement(s) 105-1 identified at 707. More specifically, the temperature processing module 107 determines whether the battery-monitoring temperature measurement 105-1 being processed exceeds any of the previous battery-monitoring temperature measurement(s) 105-1 by the temperature difference threshold.

If at 708 it is determined that the battery-monitoring temperature measurement 105-1 does not exceed any of the previous battery-monitoring temperature measurements 105-1 by the temperature difference threshold, then the method returns to 701. However, if at 708 it is determined that the battery-monitoring temperature measurement 105-1 exceeds at least one previous battery-monitoring temperature measurement 105-1 by the temperature difference threshold, then the method proceeds to 706. At 706, the temperature processing module 107 initiates at least one preventive action. Then the method returns to 701.

Figure 8:
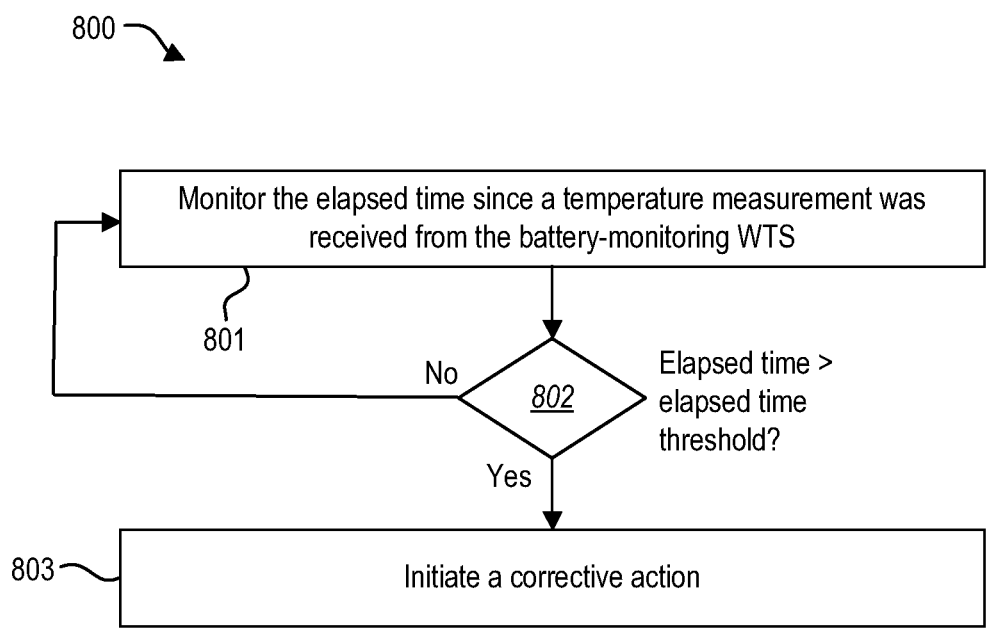
FIG. 8 illustrates an example of a method that can be performed by the temperature processing module in order to reduce the likelihood that any battery will go unmonitored for prolonged time periods.

FIG. 8 illustrates an example of a method 800 that can be performed by the temperature processing module 107 in order to reduce the likelihood that any battery 101 will go unmonitored for prolonged time periods. For clarity, the method will be described in relation to a single battery-monitoring WTS 103-1. However, the temperature processing module 107 can be configured to perform this method 800 for each battery-monitoring WTS 103-1 that is deployed in the system 100.

At 801, the temperature processing module 107 monitors the elapsed time since a temperature measurement 105-1 was received from the battery-monitoring WTS 103-1. In some embodiments, information from the sensor registry 109 can be utilized in connection with this monitoring. As noted above, each data record 125 in the sensor registry 109 corresponds to a particular battery-monitoring WTS 103-1, and each data record 125 includes (among other things) a last-received timestamp field 129 and an elapsed time field 130. In some embodiments, monitoring the elapsed time since a temperature measurement 105-1 was received from a battery-monitoring WTS 103-1 can include periodically updating the value of the elapsed time field 130 of the data record 125 corresponding to the battery-monitoring WTS 103-1 in the sensor registry 109. As noted above, the value of the elapsed time field 130 can be determined by calculating the difference between the current time and the value of the last-received timestamp field 129.

At 802, the temperature processing module 107 determines whether the elapsed time since a temperature measurement 105-1 was received from the battery-monitoring WTS 103-1 is greater than a predefined threshold amount. This predefined threshold amount may be referred to herein as the elapsed time threshold, and it can be determined based on the elapsed time threshold parameter 134 described previously.

If at 802 it is determined that the elapsed time since a temperature measurement 105-1 was received from the battery-monitoring WTS 103-1 is not greater than the elapsed time threshold, then the method returns to 801. However, if at 802 it is determined that the elapsed time since a temperature measurement 105-1 was received from the battery-monitoring WTS 103-1 is greater than the elapsed time threshold, then the method proceeds to 803.

At 803, the temperature processing module 107 initiates a corrective action with respect to the battery-monitoring WTS 103-1. There are many different types of corrective actions that can be performed in accordance with the present disclosure. For example, the temperature processing module 107 can cause a notification message to be sent to at least one communication endpoint (e.g., email address, mobile device number) that is associated with one or more users who are responsible for the storage area 102. As another example, the temperature processing module 107 can initiate a diagnostic process (which be an automated diagnostic process) to determine if the battery-monitoring WTS 103-1 is malfunctioning. As another example, if the battery-monitoring WTS 103-1 is equipped with remote power cycling capabilities, the temperature processing module 107 can attempt to restart the battery-monitoring WTS 103-1 remotely. Those skilled in the art will recognize additional corrective actions that can be performed.

In some embodiments, initiating a corrective action can include causing a message to be sent to a message queuing service. In this context, the term "message queuing service" refers to a system used for sending messages between different parts of a system (such as different software applications or components) in a decoupled manner. A message queuing service provides a queue that stores messages sent from one part of the system until they can be received and processed by another part of the system.

Figure 9:
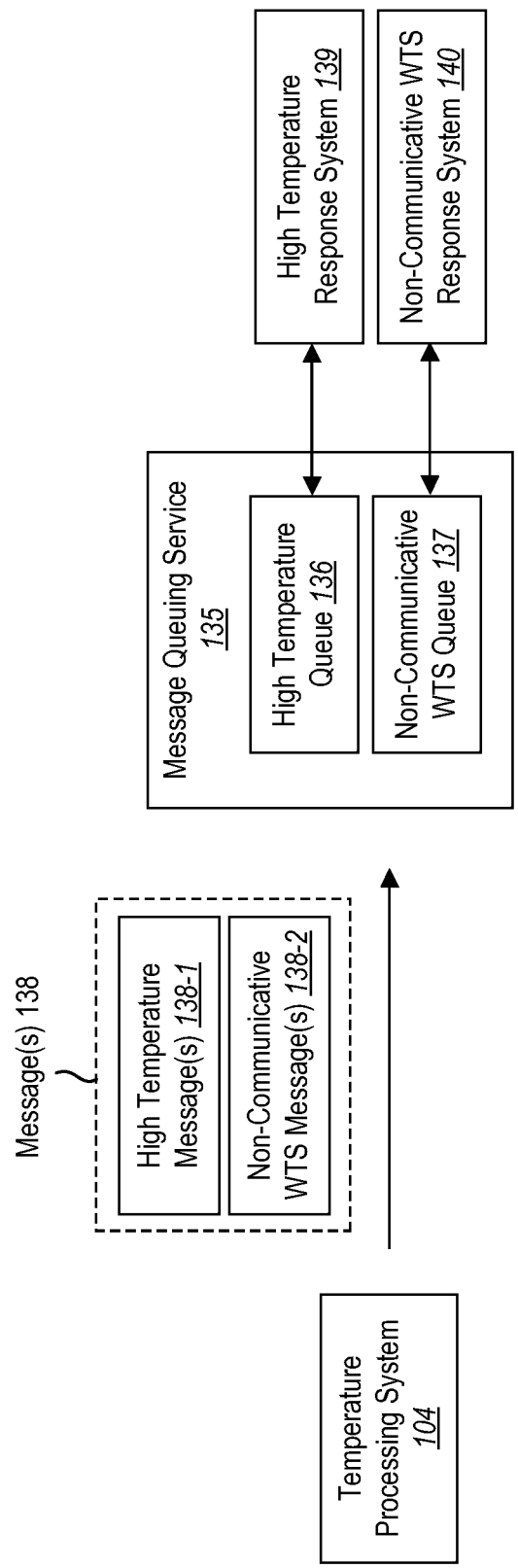
FIG. 9 illustrates an example of a message queuing service that can be utilized to implement any preventive actions and/or corrective actions that are taken in connection with the systems and methods disclosed herein.

FIG. 9 illustrates an example of a message queuing service 135 that can be utilized to implement any preventive actions and/or corrective actions that are taken in connection with the systems and methods disclosed herein. In the depicted embodiment, the message queuing service 135 maintains at least two queues: a first queue for preventive actions related to excessively high temperature measurements 105, and a second queue for corrective actions related to non-communicative battery-monitoring WTSs 103-1 (e.g., battery-monitoring WTSs 103-1 that have not sent a temperature measurement 105 for a period of time that exceeds the elapsed time threshold). The first queue may be referred to herein as a high temperature queue 136, and the second queue may be referred to herein as a non-communicative WTS queue 137.

In the depicted embodiment, when the temperature processing system 104 determines that some type of preventive or corrective action is needed, the temperature processing system 104 sends one or more messages 138 to the message queuing service 135. Messages that initiate a preventive action because a battery-monitoring temperature measurement 105-1 is deemed to be excessively high may be referred to herein as high temperature messages 138-1. Conversely, messages that initiate a corrective action because a battery-monitoring temperature measurement 105-1 has not been received from a battery-monitoring WTS 103-1 for an excessively long time period may be referred to herein as non-communicative WTS messages 138-2.

A high temperature message 138-1 can include information about the location of the battery-monitoring WTS 103-1 that reported the excessively high temperature. This location information can be derived from the information contained in the location field 128 in the data record 125 corresponding to the battery-monitoring WTS 103-1 in the sensor registry 109. A high temperature message 138-1 can also indicate one or more recommended preventive actions (including, but not limited to, the preventive actions described above as examples). In some embodiments, a high temperature message 138-1 can also include additional information, such as some or all of the information that was provided in the applicable temperature measurement packet 114 (e.g., the sensor ID 115-1 of the battery-monitoring WTS 103-1 that reported the excessively high temperature, the temperature measurement 105-1 obtained by the battery-monitoring WTS 103-1, the timestamp 117 associated with the temperature measurement 105-1).

A high temperature response system 139 is configured to process and respond to high temperature messages 138-1 from the high temperature queue 136. In some embodiments, high temperature messages 138-1 are arranged in a particular order (e.g., chronological order based on time of receipt) within the high temperature queue 136, and the high temperature response system 139 processes the high temperature messages 138-1 in the order specified. Processing a high temperature message 138-1 can include initiating one or more preventive actions. In some embodiments, the high temperature response system 139 initiates the preventive action(s) that are explicitly specified in a high temperature message 138-1. Alternatively, or in addition, the high temperature response system 139 initiates preventive action(s) that are not explicitly specified in a high temperature message 138-1 but that are based on information contained in a high temperature message 138-1.

A non-communicative WTS message 138-2 can include information about the location of the battery-monitoring WTS 103-1 that has not sent a temperature measurement 105-1 for an excessively long period of time. This location information can be derived from the information contained in the location field 128 in the data record 125 corresponding to the battery-monitoring WTS 103-1 in the sensor registry 109. A non-communicative WTS message 138-2 can also indicate one or more recommended corrective actions (including, but not limited to, the corrective actions described above as examples). In some embodiments, a non-communicative WTS message 138-2 can also include additional information, such as the timestamp 117 corresponding to the last time that the battery-monitoring WTS 103-1 reported a temperature measurement 105-1.

A non-communicative WTS response system 140 is configured to process and respond to non-communicative WTS messages 138-2 from the non-communicative WTS queue 137. In some embodiments, non-communicative WTS messages 138-2 are arranged in a particular order (e.g., chronological order based on time of receipt) within the non-communicative WTS queue 137, and the non-communicative WTS response system 140 processes the non-communicative WTS messages 138-2 in the order specified. Processing a non-communicative WTS message 138-2 can include initiating one or more corrective actions. In some embodiments, the non-communicative WTS response system 140 initiates the corrective action(s) that are explicitly specified in a non-communicative WTS message 138-2. Alternatively, or in addition, the non-communicative WTS response system 140 may initiate corrective action(s) that are not explicitly specified in a non-communicative WTS message 138-2 but that are based on information contained in a non-communicative WTS message 138-2.

Figure 10:
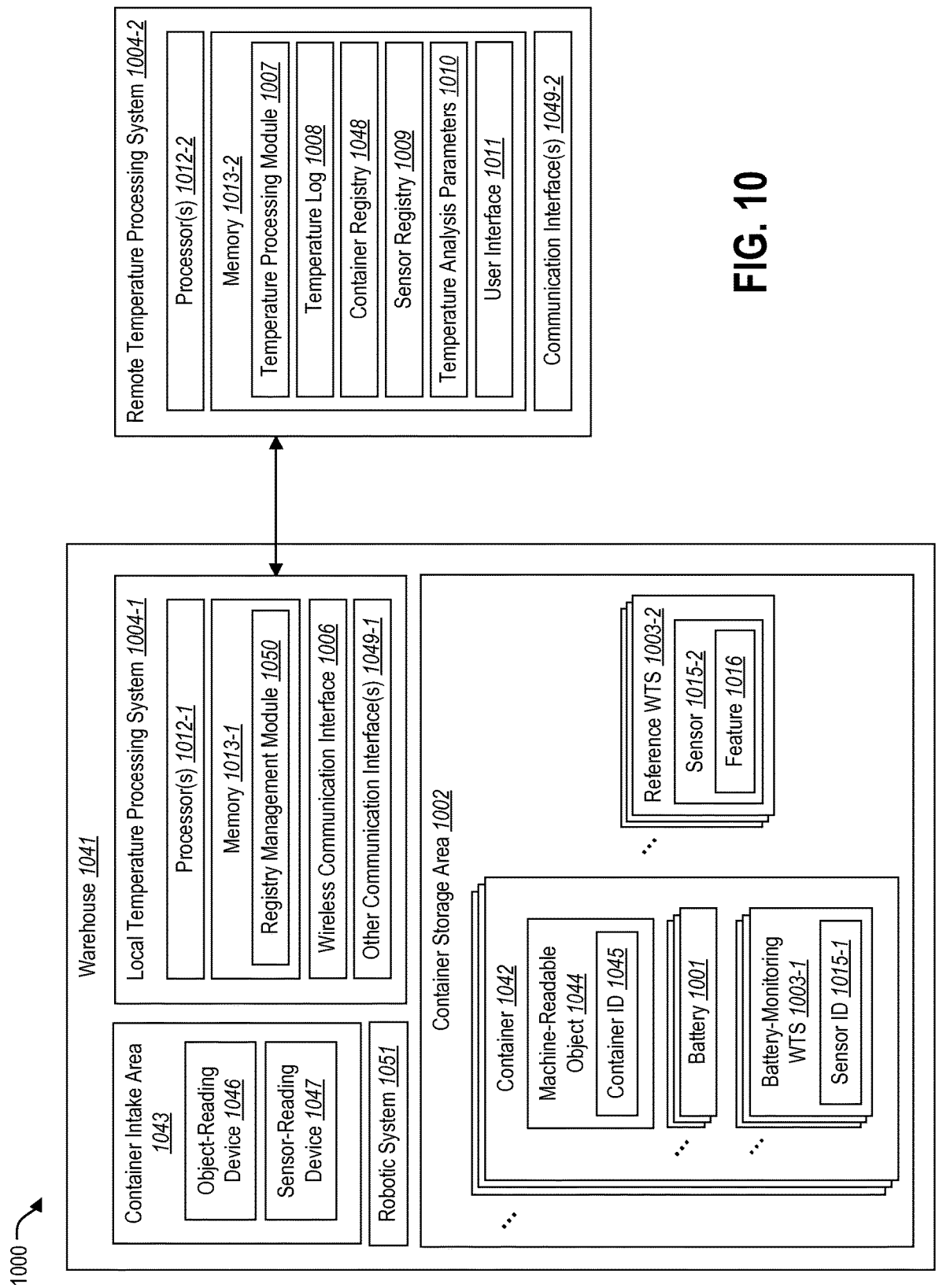
FIG. 10 illustrates an example showing how a system for monitoring thermal conditions of batteries in accordance with the present disclosure can be implemented in a warehouse.

FIG. 10 illustrates an example showing how a system 1000 for monitoring thermal conditions of batteries 1001 in accordance with the present disclosure can be implemented in a warehouse 1041. In the depicted example, the batteries 1001 are stored in containers 1042 in the warehouse 1041. In some implementations, each container 1042 includes a plurality of batteries 1001. Alternatively, each container 1042 may only include a single battery 1001.

In the depicted example, the battery-monitoring WTSs 1003-1 are attached to the containers 1042. In some implementations, a plurality of battery-monitoring WTSs 1003-1 may be attached to each container 1042. Alternatively, in other implementations, only a single battery-monitoring WTS 1003-1 may be attached to each container 1042.

In the depicted example, the warehouse 1041 includes a container storage area 1002 and a container intake area 1043 where new containers 1042 are processed before being placed in the container storage area 1002. The reference WTSs 1003-2 are positioned throughout the container storage area 1002 to provide representative ambient temperature data related to the container storage area 1002.

Each battery-monitoring WTS 1003-1 includes a sensor ID 1015-1 that uniquely identifies the battery-monitoring WTS 1003-1. Similarly, each reference WTS 1003-2 includes a sensor ID 1015-2 that uniquely identifies the reference WTS 1003-2. As before, the sensor ID 1015-2 of each reference WTS 1003-2 includes a distinguishing feature 1016 that distinguishes reference WTSs 1003-2 from battery-monitoring WTSs 1003-1.

Each container 1042 includes a machine-readable object 1044 that includes a unique container ID 1045. In this context, the term "machine-readable object" refers to a physical item or feature that can be identified and interpreted by electronic devices or systems. Some non-limiting examples of machine-readable objects 1044 include barcodes, RFID tags, NFC tags, and magnetic stripes. In some cases, plain text printed in a format that can be interpreted via optical character recognition (OCR) technology can be considered to be a machine-readable object 1044.

The container intake area 1043 includes at least one object-reading device 1046 that is configured to read the unique container ID 1045 from machine-readable objects 1044 that are attached to the containers 1042. The specific type of object-reading device 1046 that is included in the container intake area 1043 depends on the type of machine-readable object 1044 that is attached to the containers 1042. For example, if the containers 1042 are labeled with barcodes (i.e., the machine-readable objects 1044 are barcodes), then the object-reading device 1046 can be a barcode-reading device. If the machine-readable objects 1044 are RFID tags, then the object-reading device 1046 can be an RFID reader. If the machine-readable objects 1044 are NFC tags, then the object-reading device 1046 can be an NFC reader. If the machine-readable objects 1044 are magnetic stripes, then the object-reading device 1046 can be a magnetic stripe reader. If the machine-readable objects 1044 on the containers 1042 include plain text printed in a format that can be interpreted via OCR technology, then the object-reading device 1046 can be an OCR scanner.

The container intake area 1043 also includes at least one sensor-reading device 1047 that is configured to read the unique sensor ID 1015-1 from battery-monitoring WTSs 1003-1 that are attached to the containers 1042. The specific type of sensor-reading device 1047 that is included in the container intake area 1043 depends on the type of battery-monitoring WTS 1003-1 that is attached to the containers 1042. For example, if the battery-monitoring WTSs 1003-1 are RFID tags, then the sensor-reading device 1047 can be an RFID reader. If the battery-monitoring WTSs 1003-1 are configured to communicate via Wi-Fi, then the sensor-reading device 1047 can be a computing device that is equipped with Wi-Fi capabilities. If the battery-monitoring WTSs 1003-1 are configured to communicate via Bluetooth, then the sensor-reading device 1047 can include a Bluetooth receiver.

Those skilled in the art will recognize that the foregoing examples are illustrative only and should not be interpreted as limiting the scope of the present disclosure. Other machine-readable objects 1044, object-reading devices 1046, WTSs 1003, and sensor-reading devices 1047 can be utilized in accordance with the present disclosure besides those that have been specifically mentioned.

In the depicted embodiment, the temperature processing system 1004 includes at least two components: a local temperature processing system 1004-1 and a remote temperature processing system 1004-2. In some embodiments, at least some components within the remote temperature processing system 1004-2 can be implemented in the cloud.

In some alternative embodiments, the temperature processing system 1004 can be implemented entirely in a local system (e.g., a system that is located within the warehouse 1041 or in close physical proximity to the warehouse 1041) and/or entirely in a remote system (e.g., a system that is located at a remote location with respect to the warehouse 1041).

The remote temperature processing system 1004-2 includes a temperature processing module 1007, a temperature log 1008, a sensor registry 1009, temperature analysis parameters 1010, and a user interface 1011. These components are similar to the corresponding components described previously in connection with the system 100 shown in FIG. 1. The remote temperature processing system 1004-2 also includes a container registry 1048, which includes information about the containers 1042 in the container storage area 1002.

The remote temperature processing system 1004-2 includes at least one processor 1012-2 and memory 1013-2 communicatively coupled to the processor(s) 1012-2. The temperature processing module 1007, temperature log 1008, container registry 1048, sensor registry 1009, temperature analysis parameters 1010, and user interface 1011 are stored in the memory 1013-2. These components can include instructions and/or data (as those terms are defined below). The instructions within a particular component are executable by the processor(s) 1012-2 to perform the operations that are described herein in relation to the component. Execution of the instructions can involve the use of the data.

The remote temperature processing system 1004-2 also includes one or more communication interfaces 1049-2. The communication interface(s) 1049-2 facilitate communication with other computing devices and systems, such as the local temperature processing system 1004-1.

The local temperature processing system 1004-1 includes a registry management module 1050 that can be used to actively maintain and update the container registry 1048 and the sensor registry 1009 to reflect changes occurring within the container storage area 1002. When modifications are made, such as the introduction of new containers 1042 or the relocation of existing containers 1042, the registry management module 1050 can update the container registry 1048 and the sensor registry 1009 with these details, ensuring accurate tracking of the location and status of each container 1042 and each WTS 1003.

The local temperature processing system 1004-1 includes at least one processor 1012-1 and memory 1013-1 communicatively coupled to the processor(s) 1012. The registry management module 1050 is stored in the memory 1013-1. The registry management module 1050 can include instructions and/or data (as those terms are defined below). The instructions are executable by the processor(s) 1012-1 to perform the operations that are described herein in relation to the registry management module 1050. Execution of the instructions can involve the use of the data.

The local temperature processing system 1004-1 includes a wireless communication interface 1006 that is configured to receive battery-monitoring temperature measurements from the battery-monitoring WTSs 1003-1 and to receive reference temperature measurements from the reference WTSs 1003-2. The wireless communication interface 1006 is similar to the wireless communication interface 106 described previously in connection with the system 100 shown in FIG. 1.

The local temperature processing system 1004-1 also includes one or more other communication interfaces 1049-1. The other communication interface(s) 1049-1 facilitate communication with other computing devices and systems, such as the remote temperature processing system 1004-2.

The warehouse 1041 also includes a robotic system 1051. One example of a preventive action that can be taken when a battery-monitoring WTS 1003-1 reports an excessively high temperature measurement is signaling a robotic system 1051 to relocate the corresponding container 1042 (i.e., the container 1042 to which the battery-monitoring WTS 1003-1 is attached). The robotic system 1051 can be equipped with advanced motion control and precision navigation capabilities. Containers 1042 can be relocated to a designated safe area, where they can be isolated from other containers 1042. Isolating containers 1042 with excessively high temperature measurements mitigates the risk of thermal runaway and potential fire hazards, thereby reducing the risk of a catastrophic event that would compromise the safety of the warehouse 1041.

Figure 11:
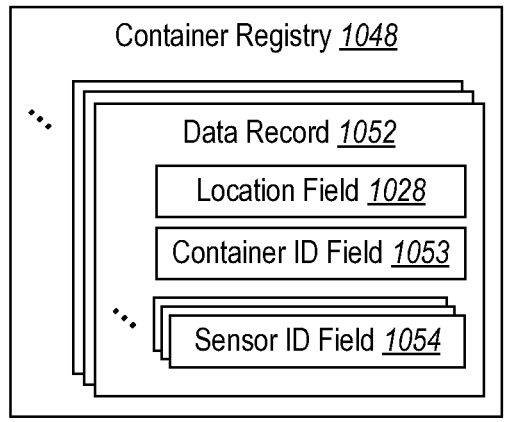
FIG. 11 illustrates an example of the container registry in the temperature processing system shown in FIG. 10.

FIG. 11 illustrates an example of the container registry 1048. As noted above, the container registry 1048 includes information about each container 1042. The container registry 1048 includes a plurality of data records 1052. Each data record 1052 corresponds to a particular container 1042.

Each data record 1052 can include a location field 1028. In a data record 1052 corresponding to a particular container 1042, the location field 1028 stores information about the location of the container 1042. Many different kinds of location information can be stored in the location field 1028, including any of the examples described previously.

Each data record 1052 can also include at least one container ID field 1053. In a data record 1052 corresponding to a particular container 1042, the container ID field 1053 can be used to store the container ID 1045 corresponding to the container 1042.

Each data record 1052 can also include at least one sensor ID field 1054. Each sensor ID field 1054 can be used to store a sensor ID 1015-1 corresponding to a battery-monitoring WTS 1003-1 that is attached to the container 1042.

Figure 12:
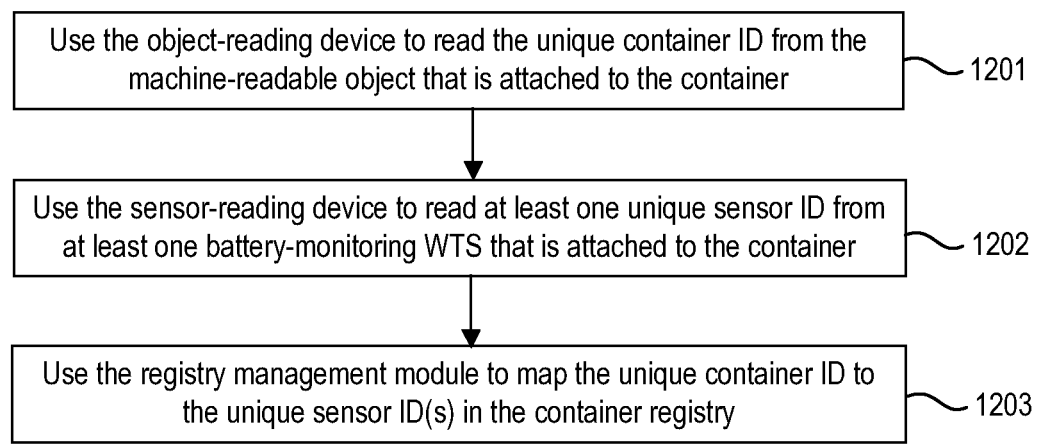
FIG. 12 illustrates a method that can be performed to process a new container before the container is placed in the container storage area in the system shown in FIG. 10.

FIG. 12 illustrates a method 1200 that can be performed to process a new container 1042 before the container 1042 is placed in the container storage area 1002. In some implementations, this method 1200 can be performed in the container intake area 1043 of the warehouse 1041.

At 1201, the object-reading device 1046 can be used to read the unique container ID 1045 from the machine-readable object 1044 that is attached to the container 1042.

At 1202, the sensor-reading device 1047 can be used to read a unique sensor ID 1015-1 from each battery-monitoring WTS 1003-1 that is attached to the container 1042. For example, if there are two battery-monitoring WTSs 1003-1 attached to a container 1042, the sensor-reading device 1047 can be used to read two unique sensor IDs 1015-1, one from each battery-monitoring WTS 1003-1 that is attached to the container 1042.

At 1203, the registry management module 1050 within the local temperature processing system 1004-1 can be used to generate a mapping, in the container registry 1048, between the unique container ID 1045 obtained at 1201 and the unique sensor ID(s) 1015-1 obtained at 1202.

For example, a data record 1052 can be created for the container 1042 in the container registry 1048. A container ID field 1053 can be created within the data record 1052, and the value of the container ID field 1053 can be set to the value of the unique container ID 1045 obtained at 1201. In addition, a sensor ID field 1054 can be created for each sensor ID 1015-1 that is read from a battery-monitoring WTS 1003-1 at 1202. The value of each sensor ID field 1054 can be set to the value of the corresponding sensor ID 1015-1.

In some embodiments, in addition to the processes described above for introducing a new container 1042 into the system 1000, the system 1000 also includes a mechanism for discontinuing the monitoring of containers 1042 that are removed from the container storage area 1002. This feature ensures efficient resource allocation and data integrity by ceasing to track containers 1042 that are no longer in the container storage area 1002.

In some embodiments, the container intake area 1043 can also be used to process containers 1042 after they have been removed from the container storage area 1002. Alternatively, another similar area within the warehouse 1041 can be used for this purpose.

When a container 1042 is designated for removal from the container storage area 1002, an object-reading device 1046 can be used to read the unique container ID 1045 from the machine-readable object 1044 on the container 1042. Upon identification, the registry management module 1050 within the local temperature processing system 1004-1 can be notified.

The registry management module 1050 may then cause the container registry 1048 to be updated to reflect the removal of the container 1042. This update may involve marking the data record 1052 corresponding to the removed container 1042 as inactive or deleted. In some embodiments, the system 1000 may additionally send a deactivation signal to the battery-monitoring WTS(s) 1003-1 associated with the removed container 1042, instructing them to cease temperature monitoring and transmission.

In some embodiments, for scenarios where a container 1042 is temporarily removed for maintenance or other purposes and then returned to the container storage area 1002, the system 1000 may provide a reactivation process. This process may involve rescanning the unique container ID 1045 upon its return, thereby reinstating its active status in the container registry 1048 and resuming temperature monitoring by the reactivated battery-monitoring WTSs 1003-1.

Figure 13:
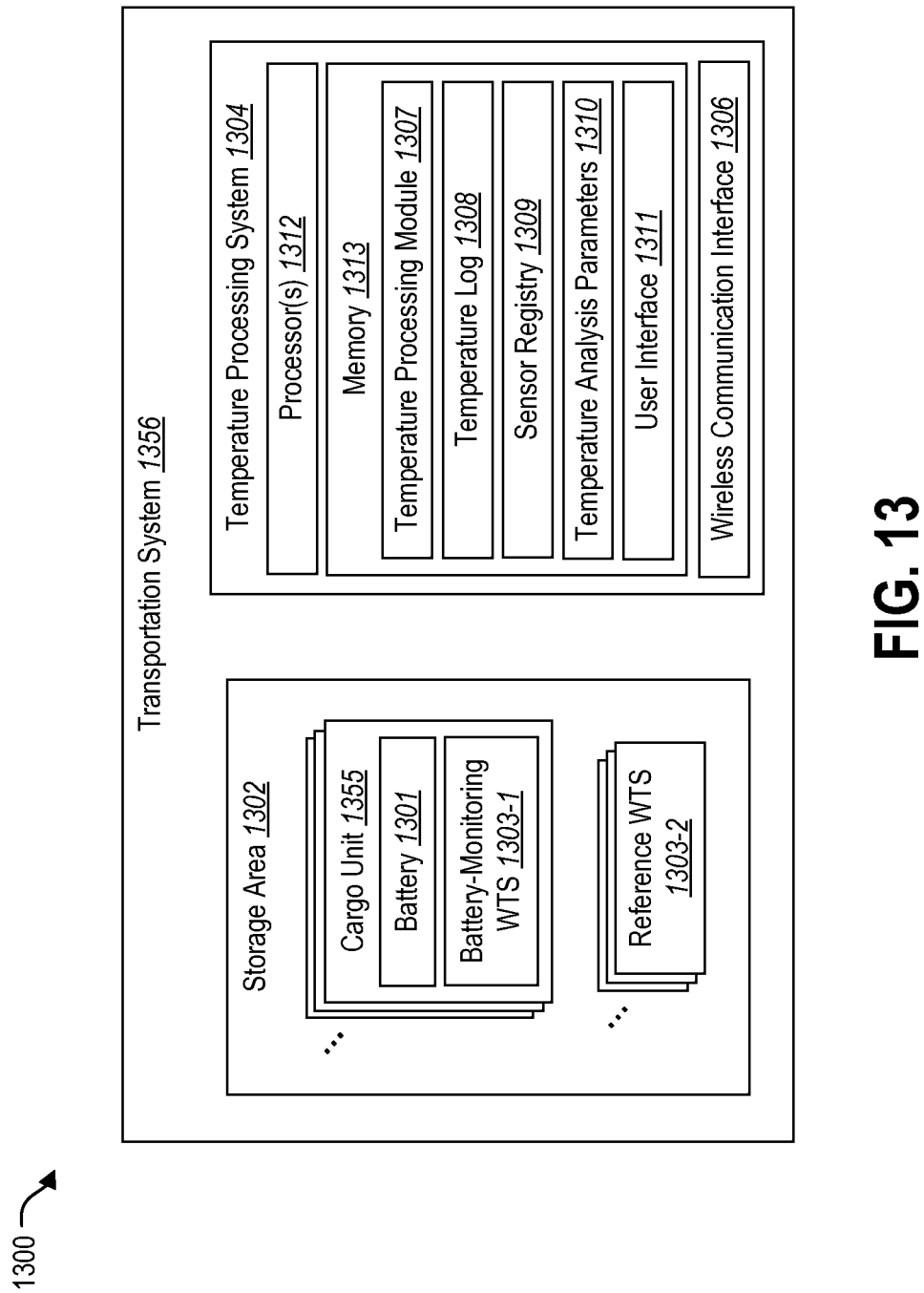
FIG. 13 illustrates an example showing how a system for monitoring thermal conditions of batteries in accordance with the present disclosure can be implemented in a maritime shipping scenario.

FIG. 13 illustrates an example showing how a system 1300 for monitoring thermal conditions of batteries 1301 in accordance with the present disclosure can be implemented in a transportation system 1356. In this example, it will be assumed that the batteries 1301 that are being monitored are included in cargo units 1355 being transported via the transportation system 1356.

The transportation system 1356 can be any mode of transport employed for the movement of goods and objects. Some non-limiting examples of the transportation system 1356 include maritime cargo ships, including but not limited to container ships, bulk carriers, and roll-on/roll-off (Ro-Ro) ships; vehicles for road transport including trucks, semi-trailer trucks, and specialized car carrier trailers designed for transporting automobiles; rail vehicles for train transport; and air vehicles such as cargo planes for air transport.

The transportation system 1356 includes a storage area 1302 where cargo units 1355 are stored as they are being transported by the transportation system 1356. The storage area 1302 is configured to accommodate a plurality of cargo units 1355. In some implementations, each object 1355 includes a battery 1301. In other implementations, only some of the cargo units 1355 include a battery 1301. In addition, in some implementations, some cargo units 1355 may include more than one battery 1301.

The cargo units 1355 being transported by the transportation system 1356 can be any items that can incorporate at least one battery 1301. Some non-limiting examples of cargo units 1355 include electric vehicles; consumer electronics such as laptops and smartphones; industrial equipment (e.g., portable power tools) that rely on battery power for operation; medical devices that are battery-operated; and renewable energy storage systems, like those used in solar power installations, which store and manage energy using lithium-ion batteries.

When the cargo units 1355 are loaded onto the transportation system 1356, a battery-monitoring WTS 1303-1 can be removably attached to each cargo unit 1355. In some embodiments, a battery-monitoring WTS 1303-1 can be attached to a cargo unit 1355 in such a way that the battery-monitoring WTS 1303-1 (i) does not damage the cargo unit 1355, and (ii) can be quickly and easily attached to and removed from the cargo unit 1355. This feature is particularly advantageous for high-value cargo units 1355, such as electric vehicles, where it can be important to maintain the integrity and value of the cargo unit 1355.

Those skilled in the art will recognize that there are many non-invasive, efficient attachment mechanisms that can be employed to removably attach a battery-monitoring WTS 1303-1 to a cargo unit 1355. One such mechanism involves the use of high-strength, weather-resistant magnetic mounts, which can securely attach a battery-monitoring WTS 1303-1 to a metallic part of a cargo unit 1355 without causing any damage. Such magnets provide a robust hold yet can be easily detached when necessary. Another method includes the utilization of adjustable, rubber-coated clamps that can be gently yet firmly affixed to various parts of a cargo unit 1355. These clamps are designed to prevent scratching or marring of the surface of the cargo unit 1355 while ensuring a stable mount for the battery-monitoring WTS 1303-1. Furthermore, reusable adhesive pads, made from materials that leave no residue and maintain their adhesive properties over multiple uses, offer a versatile solution for attaching the battery-monitoring WTSs 1303-1 to non-metallic or specially coated parts of the cargo units 1355. These pads can be quickly applied and removed, allowing for efficient deployment and retrieval of the battery-monitoring WTSs 1303-1. Lastly, hook-and-loop fasteners can be used for temporary attachment, providing a flexible and damage-free option for a wide range of attachment points on the cargo units 1355. Each of these methods ensures that a battery-monitoring WTS 1303-1 can be securely, quickly, and easily attached to and removed from a cargo unit 1355 without causing any harm to the cargo unit 1355, thereby facilitating efficient monitoring of the cargo unit 1355 as the cargo unit 1355 is being transported by the transportation system 1356.

The reference WTSs 1303-2 are positioned throughout the storage area 1302 to provide representative ambient temperature data. In some implementations, reference WTSs 1303-2 can be spaced at distinct locations both horizontally and vertically throughout the storage area 1302 to capture temperature variations at different heights in the storage area 1302 and different sections of the storage area 1302, thereby providing a spatially representative measurement of the ambient conditions surrounding the cargo units 1355.

The transportation system 1356 also includes a temperature processing system 1304, which can be similar to the temperature processing system 104 described previously. The battery-monitoring WTSs 1303-1 and the reference WTSs 1303-2 are communicatively coupled to the temperature processing system 1304. The battery-monitoring WTSs 1303-1 and the reference WTSs 1303-2 are configured to wirelessly transmit temperature measurements to the temperature processing system 1304.

The temperature processing system 1304 includes a wireless communication interface 1306 that is configured to receive battery-monitoring temperature measurements from the battery-monitoring WTSs 1303-1 and to receive reference temperature measurements from the reference WTSs 1303-2. The wireless communication interface 1306 can be similar to the wireless communication interface 106 described previously in connection with the system 100 shown in FIG. 1.

The temperature processing system 1304 includes at least one processor 1312 and memory 1313 communicatively coupled to the processor(s) 1312. The temperature processing system 1304 also includes a temperature processing module 1307, a temperature log 1308, a sensor registry 1309, temperature analysis parameters 1310, and a user interface 1311 stored in the memory 1313. These components can be similar to the corresponding components in the temperature processing system 104 described previously.

As discussed previously, the sensor registry 1309 includes information about the location of the WTSs 1303 (both battery-monitoring WTSs 1303-1 and reference WTSs 1303-2). In the context of cargo units 1355 being transported via a transportation system 1356, pinpointing the exact location of battery-monitoring WTSs 1303-1 attached to cargo units 1355 presents a significant challenge. Depending on the type of transportation system 1356 being used, the storage area 1302 can be quite extensive, and any individual cargo unit 1355 could be situated almost anywhere within the storage area 1302. Complicating matters further, many transportation systems 1356 are not equipped to track the locations of specific cargo units 1355.

To overcome these challenges, the temperature processing system 1304 can be configured to determine the location of a battery-monitoring WTS 1303-1 using geolocation techniques. In this context, the term "geolocation" refers to the process of determining or estimating the geographic location of an object, such as a battery-monitoring WTS 1303-1, using a variety of data acquisition and analysis techniques.

In some embodiments, to determine the location of a battery-monitoring WTS 1303-1, the wireless signals emitted by the battery-monitoring WTS 1303-1 can be compared with wireless signals from at least two reference WTSs 1303-2 positioned at known, fixed locations. By analyzing certain characteristics of these signals (e.g., signal strength, time of arrival), the temperature processing system 1304 can calculate the approximate position of the battery-monitoring WTS 1303-1. For example, if the signal from a battery-monitoring WTS 1303-1 is stronger at one reference WTS 1303-2 than another, it suggests that the battery-monitoring WTS 1303-1 is closer to the former. This geolocation method can provide a reliable estimate of the location of the battery-monitoring WTS 1303-1 within the confines of the storage area 1302. Once determined, this location information can be incorporated into the sensor registry 1309.

The accuracy of geolocation methods is subject to factors such as signal interference and the precise positioning of the reference WTSs 1303-2. In some embodiments, alternative methods like onboard GPS systems could supplement the geolocation methods described above.

One possible use case for the depicted system 1300 involves the transportation of electric vehicles across the ocean (or another large body of water). As noted above, there have been several recent instances where costly shipping vessels have been destroyed due to fires initiated by lithium-ion batteries experiencing thermal runaway. However, as described above, the system 1300 can also be used in connection with other types of transportation systems 1356 besides maritime shipping vessels.

In an embodiment, a system for monitoring thermal conditions of a plurality of batteries in a storage area is provided. The system includes (i) a plurality of battery-monitoring wireless temperature sensors that are configured to be placed in thermal communication with the plurality of batteries; (ii) a plurality of reference wireless temperature sensors that are positioned at a plurality of different locations within the storage area to provide representative ambient temperature data; (iii) a wireless communication interface that is configured to obtain battery-monitoring temperature measurements from the plurality of battery-monitoring wireless temperature sensors and reference temperature measurements from the plurality of reference wireless temperature sensors; (iv) one or more processors; and (v) a temperature processing module that is executable by the one or more processors to process the battery-monitoring temperature measurements based on the reference temperature measurements and previous battery-monitoring temperature measurements, wherein processing a battery-monitoring temperature measurement comprises initiating a preventive action with respect to at least one battery when the battery-monitoring temperature measurement exceeds at least one reference temperature measurement or at least one previous battery-monitoring temperature measurement by a temperature difference threshold. Optionally, in a further embodiment, the plurality of batteries are lithium-ion batteries. Optionally, in a further embodiment, the storage area is a vehicle storage area.

In some embodiments, processing the battery-monitoring temperature measurement additionally includes (i) identifying a battery-monitoring wireless temperature sensor that obtained the battery-monitoring temperature measurement; (ii) identifying a reference wireless temperature sensor that is closest in spatial proximity to the battery-monitoring wireless temperature sensor; (iii) identifying a reference temperature measurement made by the reference wireless temperature sensor that is closest in time to the battery-monitoring temperature measurement; and (iv) comparing the battery-monitoring temperature measurement to the reference temperature measurement.

In some embodiments, each battery-monitoring wireless temperature sensor and each reference wireless temperature sensor is configured to report a temperature measurement at predefined periodic time intervals.

In some embodiments, the temperature processing module is additionally executable by the one or more processors to (i) monitor the elapsed time since a temperature measurement was received from each battery-monitoring wireless temperature sensor; and (ii) initiate a corrective action when the elapsed time for any such battery-monitoring wireless temperature sensor exceeds an elapsed time threshold.

In some embodiments, monitoring the elapsed time includes (i) tracking a last-read timestamp for each battery-related wireless temperature sensor; and (ii) periodically comparing the last-read timestamp to a current time.

In some embodiments, each wireless temperature sensor is associated with a unique sensor identifier; the unique sensor identifier of each of the plurality of reference wireless temperature sensors comprises a distinguishing feature that distinguishes the plurality of reference wireless temperature sensors from the plurality of battery-monitoring wireless temperature sensors; and the temperature processing module is additionally executable by the one or more processors to determine whether a temperature measurement received from a wireless temperature sensor originates from a reference wireless temperature sensor based on whether the distinguishing feature is present within the unique sensor identifier accompanying the temperature measurement.

In some embodiments, the preventive action that is taken with respect to the at least one battery includes at least one of (i) causing a notification message to be sent to at least one communication endpoint that is associated with one or more users who are responsible for the storage area; or (ii) signaling a robotic system to automatically relocate the at least one battery.

In some embodiments, the preventive action that is taken with respect to the at least one battery comprises causing a notification message to be sent to at least one predefined communication endpoint that is associated with one or more users who are responsible for the storage area, and wherein the notification message comprises information that identifies at least one of (i) the at least one battery; (ii) a container in which the at least one battery is stored; (iii) an object in which the at least one battery is embedded; or (iv) a location of at least one of (i), (ii), or (iii).

In some embodiments, the system further includes a temperature log that stores a history of (i) the plurality of battery-monitoring temperature measurements obtained by the plurality of battery-monitoring wireless temperature sensors; and (ii) the plurality of reference temperature measurements obtained by the plurality of reference wireless temperature sensors.

In some embodiments, the plurality of batteries are included in containers that are stored within a warehouse; and at least some of the plurality of battery-monitoring wireless temperature sensors are attached to the containers.

In some embodiments, the warehouse comprises a container storage area and a container intake area where new containers are processed before being placed in the container storage area; each container comprises a machine-readable object that includes a unique container identifier; each container additionally comprises at least one battery-monitoring wireless temperature sensor; each battery-monitoring wireless temperature sensor comprises a unique sensor identifier; the container intake area comprises an object-reading device configured to read the unique container identifier from machine-readable objects that are attached to the containers; and the container intake area further comprises a sensor-reading device configured to read the unique sensor identifier from battery-monitoring wireless temperature sensors that are attached to the containers.

In some embodiments, the system further includes a registry management module that is executable by the one or more processors to perform the following operations with respect to a container before the container is added to the container storage area: (i) cause the unique container identifier to be read from the machine-readable object that is attached to the container; (ii) cause at least one unique sensor identifier to be read from at least one battery-monitoring wireless temperature sensor that is attached to the container; and (iii) cause the unique container identifier to be mapped to the at least one unique sensor identifier in a container registry.

In some embodiments, the system further comprises a container registry comprising information about the containers stored in the warehouse; and the container registry comprises, for each container, (i) location information about the container, and (ii) identifying information about one or more battery-monitoring wireless temperature sensors that are attached to the container.

In some embodiments, the plurality of batteries are included in a plurality of cargo units that are transported via a transportation system; the storage area comprises a portion of the transportation system where the plurality of cargo units are stored; and the plurality of battery-monitoring wireless temperature sensors are removably attached to the plurality of cargo units.

In some embodiments, the temperature processing module is additionally executable by the one or more processors to determine a location of a battery-monitoring wireless temperature sensor based on one or more wireless signals received from (i) the battery-monitoring wireless temperature sensor; and (ii) at least two reference wireless temperature sensors whose locations are known.

In some embodiments, the system comprises a user interface configured to display a temperature history of each active battery-monitoring wireless temperature sensor; and the temperature history for a particular battery-monitoring wireless temperature sensor comprises a time-stamped sequence of temperature measurements captured by the particular battery-monitoring wireless temperature sensor.

In some embodiments, initiating the preventive action comprises causing a message to be sent to a message queuing service; and the message queuing service maintains at least two queues, the at least two queues comprising a first queue for preventive actions related to excessively high temperature measurements and a second queue for corrective actions related to non-communicative battery-monitoring wireless temperature sensors.

In some embodiments, the system further includes (i) a high temperature response system that is configured to process and respond to high temperature messages from the first queue; and (ii) a non-communicative wireless temperature sensor response system that is configured to process and respond to non-communicative wireless temperature sensor messages from the second queue.

In some embodiments, the plurality of reference wireless temperature sensors are spaced at distinct locations both horizontally and vertically throughout the storage area to capture temperature variations at different heights in the storage area and different sections of the storage area.

In an embodiment, a method for monitoring thermal conditions of a plurality of batteries in a storage area is provided. The method includes (i) placing a plurality of battery-monitoring wireless temperature sensors in thermal communication with the plurality of batteries; (ii) placing a plurality of reference wireless temperature sensors at a plurality of different locations within the storage area to provide representative ambient temperature data; (iii) obtaining a plurality of reference temperature measurements from the plurality of reference wireless temperature sensors; (iv) obtaining a plurality of battery-monitoring temperature measurements from the plurality of battery-monitoring wireless temperature sensors; and (v) processing the plurality of battery-monitoring temperature measurements based on the plurality of reference wireless temperature measurements, wherein processing a battery-monitoring temperature measurement comprises initiating a preventive action with respect to at least one battery when the battery-monitoring temperature measurement exceeds at least one reference temperature measurement or at least one previous battery-monitoring temperature measurement by a temperature difference threshold. Optionally, in a further embodiment, the plurality of batteries are lithium-ion batteries. Optionally, in a further embodiment, the storage area is a vehicle storage area.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random-access memory (RAM), read-only memory (ROM), non-volatile random-access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

Any communication interface(s) described herein can be based on wireless communication technology and/or wired communication technology. Some examples of communication interfaces that are based on wireless communication technology were described above. Some examples of communication interfaces that are based on wired communication technology include a Universal Serial Bus (USB) and an Ethernet adapter.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for monitoring thermal conditions of a plurality of batteries in a storage area, the system comprising:
   a plurality of battery-monitoring wireless temperature sensors that are configured to be placed in thermal communication with the plurality of batteries;
   a plurality of reference wireless temperature sensors that are positioned at a plurality of different locations within the storage area to provide representative ambient temperature data;
   a wireless communication interface that is configured to obtain battery-monitoring temperature measurements from the plurality of battery-monitoring wireless temperature sensors and reference temperature measurements from the plurality of reference wireless temperature sensors;
   one or more processors;
   memory communicatively coupled to the one or more processors;
   a temperature log stored in the memory, wherein the temperature log comprises a history of temperature measurements received from the plurality of battery-monitoring wireless temperature sensors and the plurality of reference wireless temperature sensors;
   a sensor registry stored in the memory, wherein the sensor registry comprises information about the plurality of battery-monitoring wireless temperature sensors and the plurality of reference wireless temperature sensors; and
   a temperature processing module that is stored in the memory and executable by the one or more processors to process the battery-monitoring temperature measurements based on the reference temperature measurements and previous battery-monitoring temperature measurements, wherein processing a battery-monitoring temperature measurement received from a battery-monitoring wireless temperature sensor comprises:
      identifying a reference wireless temperature sensor that is closest in spatial proximity to the battery-monitoring wireless temperature sensor based on location fields in the sensor registry;
      comparing the battery-monitoring temperature measurement to at least one reference temperature measurement made by the reference wireless temperature sensor and to at least one previous battery-monitoring temperature measurement made by the battery-monitoring wireless temperature sensor, the at least one reference temperature measurement and the at least one previous battery-monitoring temperature measurement being stored in the temperature log; and
      initiating a preventive action with respect to at least one battery when the battery-monitoring temperature measurement exceeds at least one reference temperature measurement or at least one previous battery-monitoring temperature measurement by a temperature difference threshold.

2. The system of claim 1, wherein each battery-monitoring wireless temperature sensor and each reference wireless temperature sensor is configured to report a temperature measurement at predefined periodic time intervals.

3. The system of claim 1, wherein the temperature processing module is additionally executable by the one or more processors to:
   monitor the elapsed time since a temperature measurement was received from each battery-monitoring wireless temperature sensor; and
   initiate a corrective action when the elapsed time for any such battery-monitoring wireless temperature sensor exceeds an elapsed time threshold.

4. The system of claim 3, wherein monitoring the elapsed time comprises:
   tracking a last-read timestamp for each battery-related wireless temperature sensor; and
   periodically comparing the last-read timestamp to a current time.

5. The system of claim 1, wherein:
   each wireless temperature sensor is associated with a unique sensor identifier;
   the unique sensor identifier of each of the plurality of reference wireless temperature sensors comprises a distinguishing feature that distinguishes the plurality of reference wireless temperature sensors from the plurality of battery-monitoring wireless temperature sensors; and
   the temperature processing module is additionally executable by the one or more processors to determine whether a temperature measurement received from a wireless temperature sensor originates from a reference wireless temperature sensor based on whether the distinguishing feature is present within the unique sensor identifier accompanying the temperature measurement.

6. The system of claim 1, wherein the preventive action that is taken with respect to the at least one battery comprises at least one of:
   causing a notification message to be sent to at least one communication endpoint that is associated with one or more users who are responsible for the storage area; or
   signaling a robotic system to automatically relocate the at least one battery.

7. The system of claim 1, wherein the preventive action that is taken with respect to the at least one battery comprises causing a notification message to be sent to at least one predefined communication endpoint that is associated with one or more users who are responsible for the storage area, and wherein the notification message comprises information that identifies at least one of:
   (i) the at least one battery;
   (ii) a container in which the at least one battery is stored;
   (iii) an object in which the at least one battery is embedded; or
   (iv) a location of at least one of (i), (ii), or (iii).

8. The system of claim 1, wherein:
   the plurality of batteries are included in containers that are stored within a warehouse; and
   at least some of the plurality of battery-monitoring wireless temperature sensors are attached to the containers.

9. The system of claim 8, wherein:
   the warehouse comprises a container storage area and a container intake area where new containers are processed before being placed in the container storage area;
   each container comprises a machine-readable object that includes a unique container identifier;
   each container additionally comprises at least one battery-monitoring wireless temperature sensor;
   each battery-monitoring wireless temperature sensor comprises a unique sensor identifier;

the container intake area comprises an object-reading device configured to read the unique container identifier from machine-readable objects that are attached to the containers; and the container intake area further comprises a sensor-reading device configured to read the unique sensor identifier from battery-monitoring wireless temperature sensors that are attached to the containers.

10. The system of claim 9, further comprising a registry management module that is executable by the one or more processors to perform the following operations with respect to a container before the container is added to the container storage area:
cause the unique container identifier to be read from the machine-readable object that is attached to the container;
cause at least one unique sensor identifier to be read from at least one battery-monitoring wireless temperature sensor that is attached to the container; and
cause the unique container identifier to be mapped to the at least one unique sensor identifier in a container registry.

11. The system of claim 9, wherein:
the system further comprises a container registry comprising information about the containers stored in the warehouse; and
the container registry comprises, for each container, (i) location information about the container, and (ii) identifying information about one or more battery-monitoring wireless temperature sensors that are attached to the container.

12. The system of claim 1, wherein:
the plurality of batteries are included in a plurality of cargo units that are transported via a transportation system;
the storage area comprises a portion of the transportation system where the plurality of cargo units are stored; and
the plurality of battery-monitoring wireless temperature sensors are removably attached to the plurality of cargo units.

13. The system of claim 1, wherein the temperature processing module is additionally executable by the one or more processors to determine a location of a battery-monitoring wireless temperature sensor based on one or more wireless signals received from:
the battery-monitoring wireless temperature sensor; and
at least two reference wireless temperature sensors whose locations are known.

14. The system of claim 1, wherein:
the system comprises a user interface configured to display a temperature history of each active battery-monitoring wireless temperature sensor; and
the temperature history for a particular battery-monitoring wireless temperature sensor comprises a time-stamped sequence of temperature measurements captured by the particular battery-monitoring wireless temperature sensor.

15. The system of claim 1, wherein:
initiating the preventive action comprises causing a message to be sent to a message queuing service; and
the message queuing service maintains at least two queues, the at least two queues comprising a first queue for preventive actions related to excessively high temperature measurements and a second queue for corrective actions related to non-communicative battery-monitoring wireless temperature sensors.

16. The system of claim 15, further comprising:
a high temperature response system that is configured to process and respond to high temperature messages from the first queue; and
a non-communicative wireless temperature sensor response system that is configured to process and respond to non-communicative wireless temperature sensor messages from the second queue.

17. The system of claim 1, wherein the plurality of reference wireless temperature sensors are spaced at distinct locations both horizontally and vertically throughout the storage area to capture temperature variations at different heights in the storage area and different sections of the storage area.

18. A method for monitoring thermal conditions of a plurality of batteries in a storage area, the method comprising:
placing a plurality of battery-monitoring wireless temperature sensors in thermal communication with the plurality of batteries;
placing a plurality of reference wireless temperature sensors at a plurality of different locations within the storage area to provide representative ambient temperature data;
providing a temperature log and a sensor registry in computer memory;
storing information about the plurality of battery-monitoring wireless temperature sensors and the plurality of reference wireless temperature sensors in the sensor registry;
obtaining a plurality of reference temperature measurements from the plurality of reference wireless temperature sensors;
storing the plurality of reference temperature measurements in the temperature log;
obtaining a plurality of battery-monitoring temperature measurements from the plurality of battery-monitoring wireless temperature sensors;
storing the plurality of battery-monitoring temperature measurements in the temperature log; and
processing the plurality of battery-monitoring temperature measurements based on the plurality of reference wireless temperature measurements, wherein processing a battery-monitoring temperature measurement obtained from a battery-monitoring wireless temperature sensor comprises:
identifying a reference wireless temperature sensor that is closest in spatial proximity to the battery-monitoring wireless temperature sensor based on location fields in the sensor registry;
comparing the battery-monitoring temperature measurement to at least one reference temperature measurement made by the reference wireless temperature sensor and to at least one previous battery-monitoring temperature measurement made by the battery-monitoring wireless temperature sensor, the at least one reference temperature measurement and the at least one previous battery-monitoring temperature measurement being stored in the temperature log; and
initiating a preventive action with respect to at least one battery when the battery-monitoring temperature measurement exceeds at least one reference temperature measurement or at least one previous battery-monitoring temperature measurement by a temperature difference threshold.

19. The method of claim 18, further comprising:
monitoring the elapsed time since a temperature measurement was received from each battery-monitoring wireless temperature sensor; and
initiating a corrective action when the elapsed time for any such battery-monitoring wireless temperature sensor exceeds an elapsed time threshold.

20. The method of claim 18, wherein initiating the preventive action comprises at least one of:
causing a notification message to be sent to at least one communication endpoint that is associated with one or more users who are responsible for the storage area; or
signaling a robotic system to automatically relocate the at least one battery.

\* \* \* \* \*